(12) United States Patent
Kumar et al.

(10) Patent No.: US 11,812,316 B2
(45) Date of Patent: Nov. 7, 2023

(54) HANDOVER OPTIMIZATION BASED ON UE MOBILITY PREDICTION

(71) Applicant: QUALCOMM Incorporated, San Diego, CA (US)

(72) Inventors: Rajeev Kumar, San Diego, CA (US); Xipeng Zhu, San Diego, CA (US); Ozcan Ozturk, San Diego, CA (US); Shankar Krishnan, San Diego, CA (US); Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/949,028

(22) Filed: Oct. 9, 2020

(65) Prior Publication Data
US 2022/0116838 A1 Apr. 14, 2022

(51) Int. Cl.
*H04W 36/00* (2009.01)
*H04W 36/08* (2009.01)
*H04W 36/32* (2009.01)
*H04W 36/36* (2009.01)

(52) U.S. Cl.
CPC . *H04W 36/00835* (2018.08); *H04W 36/0058* (2018.08); *H04W 36/08* (2013.01); *H04W 36/32* (2013.01); *H04W 36/36* (2013.01)

(58) Field of Classification Search
CPC ....... H04W 36/00835; H04W 36/0058; H04W 36/08; H04W 36/32; H04W 36/36
USPC ....................................................... 455/370
See application file for complete search history.

(56) References Cited

U.S. PATENT DOCUMENTS

| 10,779,198 | B1 * | 9/2020 | Oroskar | H04W 36/00837 |
| 11,032,745 | B2 * | 6/2021 | Caldenhoven | H04W 36/0022 |
| 2007/0149197 | A1 | 6/2007 | Lee et al. | |
| 2009/0176490 | A1 * | 7/2009 | Kazmi | H04J 11/0093 |
| | | | | 455/434 |
| 2012/0135735 | A1 * | 5/2012 | Ponce De Leon | H04W 36/30 |
| | | | | 455/436 |
| 2012/0208539 | A1 * | 8/2012 | Alonso-Rubio | H04W 36/08 |
| | | | | 455/436 |
| 2015/0119043 | A1 * | 4/2015 | Gopal | H04W 36/00835 |
| | | | | 455/437 |
| 2016/0345222 | A1 * | 11/2016 | Axmon | H04W 36/04 |
| 2017/0374587 | A1 * | 12/2017 | Liu | H04W 36/0085 |

(Continued)

FOREIGN PATENT DOCUMENTS

| CN | WO2020238629 | * | 5/2020 | ............ H04W 36/14 |
| EP | 2385725 A1 | * | 11/2011 | ........ H04W 36/0055 |

(Continued)

OTHER PUBLICATIONS

International Search Report and Written Opinion—PCT/US2021/071389—ISA/EPO—dated Jan. 4, 2022.

*Primary Examiner* — Charles N Appiah
*Assistant Examiner* — Frank E Donado
(74) *Attorney, Agent, or Firm* — Harrity & Harrity, LLP

(57) ABSTRACT

Various aspects of the present disclosure generally relate to wireless communication. In some aspects, a user equipment (UE) may determine one or more candidate base stations for a handover procedure for the UE. The UE may transmit an indication of the one or more candidate base stations to a serving base station. Numerous other aspects are provided.

30 Claims, 13 Drawing Sheets

(56) References Cited

U.S. PATENT DOCUMENTS

| | | | |
|---|---|---|---|
| 2020/0015135 A1* | 1/2020 | Ericson | H04W 36/0094 |
| 2020/0112899 A1* | 4/2020 | Mysore Annaiah | H04W 36/38 |
| 2020/0305037 A1* | 9/2020 | Zou | H04W 36/0077 |
| 2020/0351735 A1* | 11/2020 | Latheef | H04W 36/0085 |
| 2021/0105690 A1* | 4/2021 | Wu | H04W 76/27 |
| 2021/0211946 A1* | 7/2021 | Li | H04W 36/0055 |
| 2021/0360495 A1* | 11/2021 | Lovlekar | H04W 36/08 |
| 2022/0086711 A1* | 3/2022 | Wang | H04W 36/14 |

FOREIGN PATENT DOCUMENTS

| | | |
|---|---|---|
| WO | 2020069664 A1 | 4/2020 |
| WO | 2020087432 A1 | 5/2020 |
| WO | 2020197459 A1 | 10/2020 |

* cited by examiner

HANDOVER OPTIMIZATION BASED ON UE MOBILITY PREDICTION

FIELD OF THE DISCLOSURE

Aspects of the present disclosure generally relate to wireless communication and to techniques and apparatuses for handover optimization based at least in part on a user equipment (UE) mobility prediction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining one or more candidate base stations for a handover procedure for the UE; and transmitting, in a radio resource control (RRC) communication, an indication of the one or more candidate base stations to a serving base station.

In some aspects, a method of wireless communication performed by a UE includes transmitting, to a serving base station, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and receiving, from the serving base station and based at least in part on transmitting the communication, an indication of one or more target base stations for the handover procedure for the UE, wherein the one or more target base stations are included among the one or more candidate base stations.

In some aspects, a method of wireless communication performed by a serving base station includes receiving, from a UE, An RRC communication indicating one or more candidate base stations for a handover procedure for the UE; and transmitting, to the UE, an indication of one or more target base stations for the handover procedure for the UE, wherein the one or more target base stations are included among the one or more candidate base stations.

In some aspects, a method of wireless communication performed by a serving base station includes receiving, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and transmitting, to the UE and based at least in part on receiving the communication, an indication of one or more target base stations for the handover procedure for the UE, wherein the one or more target base stations are included among the one or more candidate base stations.

In some aspects, a UE for wireless communication includes a memory and one or more processors operatively coupled to the memory, the memory and the one or more processors configured to determine one or more candidate base stations for a handover procedure for the UE; and transmit, in An RRC communication, an indication of the one or more candidate base stations to a serving base station.

In some aspects, a UE for wireless communication includes a memory and one or more processors operatively coupled to the memory, the memory and the one or more processors configured to transmit, to a serving base station, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and receive, from the serving base station and based at least in part on transmitting the communication, an indication of one or more target base stations for the handover procedure for the UE, wherein the one or more target base stations are included among the one or more candidate base stations.

In some aspects, a serving base station for wireless communication includes a memory and one or more processors operatively coupled to the memory, the memory and the one or more processors configured to receive, from a UE, An RRC communication indicating one or more candidate base stations for a handover procedure for the UE; and transmit, to the UE, an indication of one or more target base stations for the handover procedure for the UE, wherein the one or more target base stations are included among the one or more candidate base stations.

In some aspects, a serving base station for wireless communication includes a memory and one or more processors operatively coupled to the memory, the memory and the one or more processors configured to receive, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and transmit, to the UE and based at least in part on receiving the communication, an indication of one or more target base stations for the handover procedure for the UE, wherein the one or more target base stations are included among the one or more candidate base stations.

In some aspects, a non-transitory computer-readable medium storing a set of instructions for wireless communication includes one or more instructions that, when executed by one or more processors of a UE, cause the UE to determine one or more candidate base stations for a handover procedure for the UE; and transmit, in An RRC communication, an indication of the one or more candidate base stations to a serving base station.

In some aspects, a non-transitory computer-readable medium storing a set of instructions for wireless communication includes one or more instructions that, when executed by one or more processors of a UE, cause the UE to transmit, to a serving base station, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and receive, from the serving base station and based at least in part on transmitting the communication, an indication of one or more target base stations for the handover procedure for the UE, wherein the one or more target base stations are included among the one or more candidate base stations.

In some aspects, a non-transitory computer-readable medium storing a set of instructions for wireless communication includes one or more instructions that, when executed by one or more processors of a serving base station, cause the serving base station to receive, from a UE, An RRC communication indicating one or more candidate base stations for a handover procedure for the UE; and transmit, to the UE, an indication of one or more target base stations for the handover procedure for the UE, wherein the one or more target base stations are included among the one or more candidate base stations.

In some aspects, a non-transitory computer-readable medium storing a set of instructions for wireless communication includes one or more instructions that, when executed by one or more processors of a serving base station, cause the serving base station to receive, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and transmit, to the UE and based at least in part on receiving the communication, an indication of one or more target base stations for the handover procedure for the UE, wherein the one or more target base stations are included among the one or more candidate base stations.

In some aspects, an apparatus for wireless communication includes means for determining one or more candidate base stations for a handover procedure for the apparatus; and means for transmitting, in An RRC communication, an indication of the one or more candidate base stations to a serving base station.

In some aspects, an apparatus for wireless communication includes means for transmitting, to a serving base station, a communication that includes an indication of respective probabilities, based at least in part on a mobility prediction for the apparatus, that the apparatus will encounter each of one or more candidate base stations for a handover procedure for the apparatus, an indication of respective timings, based at least in part on the mobility prediction, for adding each of the one or more candidate base stations to a target base station list associated with the apparatus, and a measurement report associated with the one or more candidate base stations; and means for receiving, from the serving base station and based at least in part on transmitting the communication, an indication of one or more target base stations for the handover procedure for the apparatus, wherein the one or more target base stations are included among the one or more candidate base stations.

In some aspects, an apparatus for wireless communication includes means for receiving, from a UE, An RRC communication indicating one or more candidate base stations for a handover procedure for the UE; and means for transmitting, to the UE, an indication of one or more target base stations for the handover procedure for the UE, wherein the one or more target base stations are included among the one or more candidate base stations.

In some aspects, an apparatus for wireless communication includes means for receiving, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and means for transmitting, to the UE and based at least in part on receiving the communication, an indication of one or more target base stations for the handover procedure for the UE, wherein the one or more target base stations are included among the one or more candidate base stations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
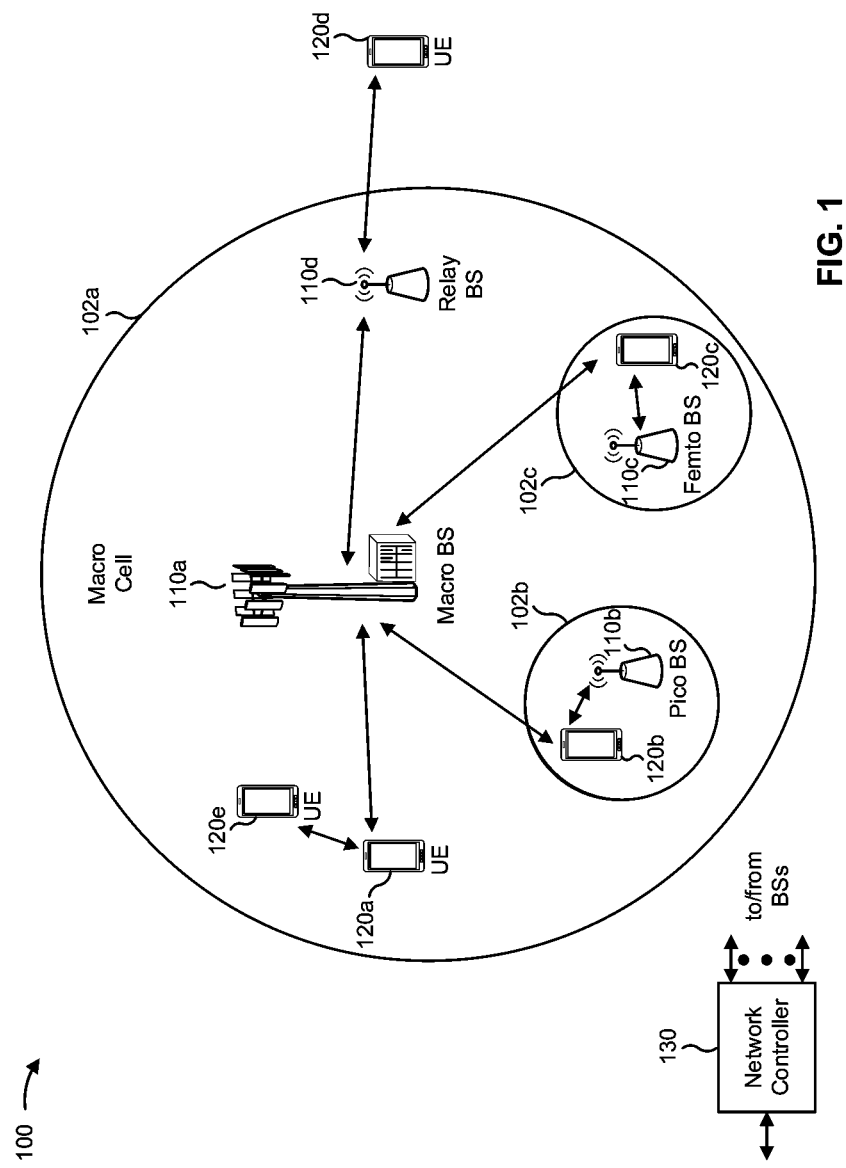
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
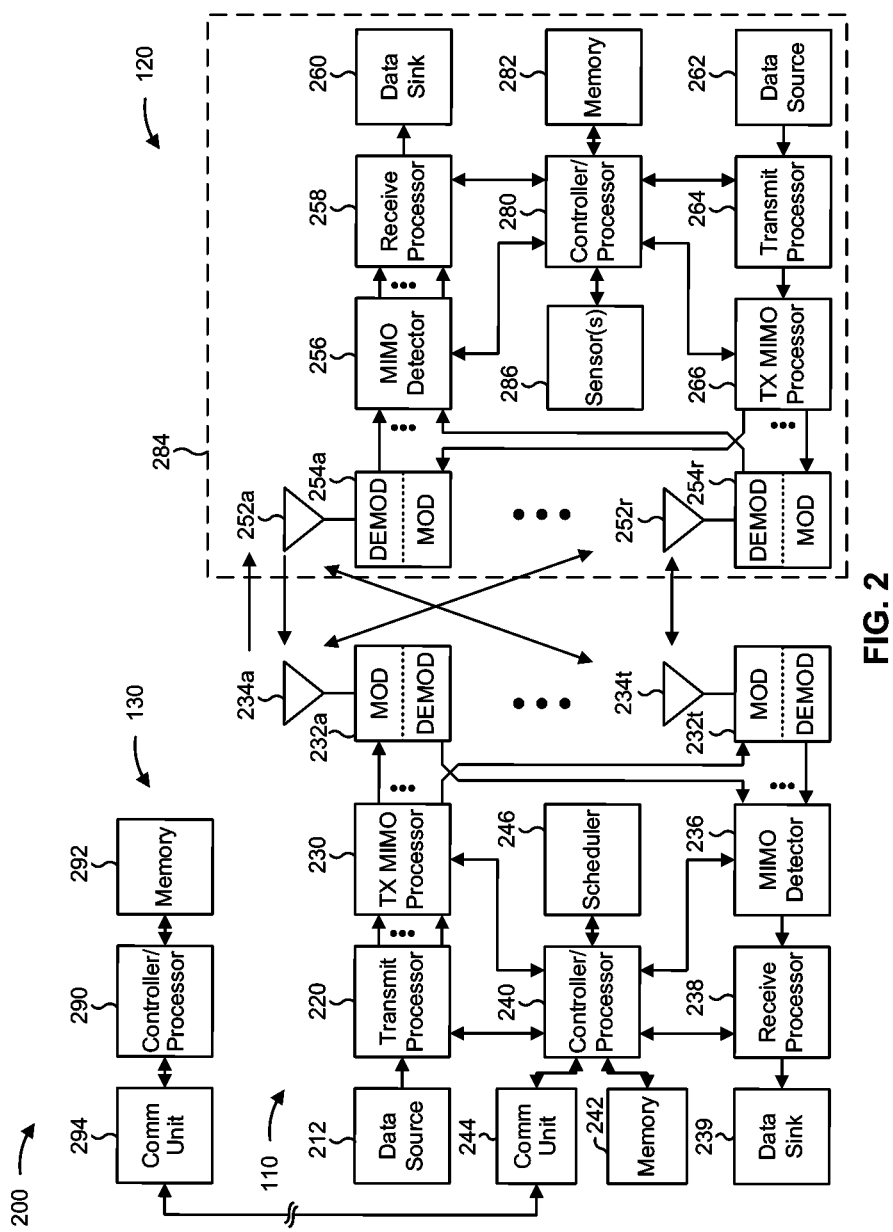
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

As further shown in FIG. 2, UE 120 may include one or more sensors 286. Sensor(s) 286 may include an optical sensor that has a field of view in which sensor(s) 286 may determine one or more characteristics of an environment of the UE 120, may include a camera, may include magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e.g, that uses triangulation, multi-lateration, etc.), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like. In some aspects, sensor(s) 286 may generate various types of sensor data, such as positioning data, location data, movement and/or mobility data, orientation data, and/or other types of sensor data. In some aspects, the UE 120 may use the sensor data to perform a mobility prediction for the UE 120, as described herein. In some aspects, one or more components of UE 120 may be included in a housing 284, mounted to or installed on the housing 284, and/or the like.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-9.

Controller/processor 240 of base station 110, controller/processor 280 of UE 120, and/or any other component(s) of FIG. 2 may perform one or more techniques associated with handover optimization based at least in part on a UE mobility prediction, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, the UE 120 includes means for determining one or more candidate base stations for a handover procedure for the UE; and/or means for transmitting, in An RRC communication, an indication of the one or more candidate base stations to a serving base station. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282. In some aspects, the UE 120 includes means for determining the one or more candidate base stations based at least in part on a mobility prediction for the UE 120. In some aspects, the UE 120 includes means for transmitting the indication of the one or more candidate base stations to the serving base station based at least in part on determining that respective probabilities, based at least in part on the mobility prediction, that the UE 120 will encounter each of the one or more candidate base stations satisfy a probability threshold. In some aspects, the UE 120 includes means for transmitting, to the serving base station, an indication of a UE capability associated with the UE 120; and/or means for receiving, based at least in part on the UE capability, an indication of the probability threshold from the serving base station.

In some aspects, the UE 120 includes means for transmitting, to the serving base station, an indication that the mobility prediction for the UE 120 is available; means for receiving, from the serving base station and based at least in part on transmitting the indication that the mobility prediction for the UE 120 is available, an indication to transmit the mobility prediction for the UE 120 to the serving base station; and/or means for transmitting, to the serving base station and based at least in part on receiving the indication to transmit the mobility prediction for the UE 120, an indication of the mobility prediction for the UE 120. In some aspects, the UE 120 includes means for updating the indication of the mobility prediction for the UE 120 based at least in part on a particular time interval indicated by the serving base station.

In some aspects, the UE 120 includes means for determining a single candidate base station based at least in part on at least one of one or more signal measurements for the single candidate base station, or a cell coverage parameter for the single candidate base station with an indication of the UE mobility prediction. In some aspects, the UE 120 includes means for receiving, from the serving base station, an indication of a plurality of target base stations for the handover procedure for the UE 230, and means for identifying a target base station of the plurality of target base stations based at least in part on a probability that the UE 120 will encounter the target base station. In some aspects, the UE 120 includes means for receiving the indication of the plurality of target base stations based at least in part on respective probabilities that the UE 120 will encounter each of the plurality of target base stations satisfying a probability threshold.

In some aspects, the UE 120 includes means for determining one or more parameters for the handover procedure for the UE 120 based at least in part on the probability. In some aspects, the UE 120 includes means for receiving, from the serving base station, an indication of a target base station for the handover procedure for the UE 120, means for determining that a first probability that the UE will encounter the target base station is less than a second probability that the UE 120 will encounter another candidate base station of the one or more candidate base stations; and/or means for refraining from performing the handover procedure with the target base station based at least in part on determining that the first probability is less than the second probability.

In some aspects, the UE 120 includes means for transmitting, to the serving base station, a measurement report associated with the one or more candidate base stations; and/or means for receiving, from the serving base station, an indication of one or more target base stations for the handover procedure for the UE 120. In some aspects, the UE 120 includes means for transmitting the measurement report based at least in part on a particular time interval indicated by the serving base station. In some aspects, the UE 120 includes means for updating, at a particular time interval, the indication of the one or more candidate base stations prior to reception of a radio resource control (RRC) reconfiguration communication.

In some aspects, the UE 120 includes means for transmitting, to a serving base station, a communication that includes: an indication of respective probabilities, based at least in part on a mobility prediction for the UE 120, that the UE 120 will encounter each of one or more candidate base stations for a handover procedure for the UE 120, an indication of respective timings, based at least in part on the mobility prediction, for adding each of the one or more candidate base stations to a target base station list associated with the UE 120, and a measurement report associated with the one or more candidate base stations; and/or means for receiving, from the serving base station and based at least in part on transmitting the communication, an indication of one or more target base stations for the handover procedure for the UE 120, wherein the one or more target base stations are included among the one or more candidate base stations. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for receiving, from the serving base station, an indication of one or more handover parameters, for the handover procedure for the UE 120, that are based at least in part on at least one of the respective probabilities, the respective timings, the measurement report, or an outcome of a previous handover procedure for the UE 120. In some aspects, the UE 120 includes means for transmitting the communication based at least in part on a time interval, indicated by the serving base station, for a measurement report.

In some aspects, the base station 110 includes means for receiving, from a UE, An RRC communication indicating one or more candidate base stations for a handover procedure for the UE; and/or means for transmitting, to the UE, an indication of one or more target base stations for the handover procedure for the UE, wherein the one or more target base stations are included among the one or more candidate base stations. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for receiving, from the UE, an indication of a UE capability associated with the UE; and/or means for transmitting, based at least in part on the UE capability, an indication of a probability threshold, means for receiving the RRC communication based at least in part on respective probabilities, that the UE will encounter each of the one or more candidate base stations, satisfying the probability threshold. In some aspects, the base station 110 includes means for receiving, from the UE, a measurement report associated with the one or more candidate base stations; and/or means for determining the one or more target base stations based at least in part on at least one of the indication of the one or more candidate base stations, or the measurement report.

In some aspects, the base station 110 includes means for transmitting, to the UE, an indication of a particular time interval for transmitting the measurement report; and/or means for receiving the measurement report based at least in part on the particular time interval. In some aspects, the base station 110 includes means for receiving, from the UE, an indication that the mobility prediction for the UE is available; means for transmitting, to the UE and based at least in part on receiving the indication that the mobility prediction for the UE is available, an indication to transmit the mobility prediction for the UE to the serving base station; and/or means for receiving, from the UE and based at least in part on receiving the indication to transmit the mobility prediction for the UE, an indication of the mobility prediction for the UE.

In some aspects, the base station 110 includes means for receiving, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations; and/or means for transmitting, to the UE and based at least in part on receiving the communication, an indication of one or more target base stations for the handover procedure for the UE, wherein the one or more target base stations are included among the one or more candidate base stations. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for determining one or more handover parameters, for the handover procedure for the UE, that are based at least in part on at least one of: means for transmitting an indication of the one or more handover parameters to the UE. In some aspects, the base station 110 includes means for receiving the communication based at least in part on a time interval for a measurement report.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
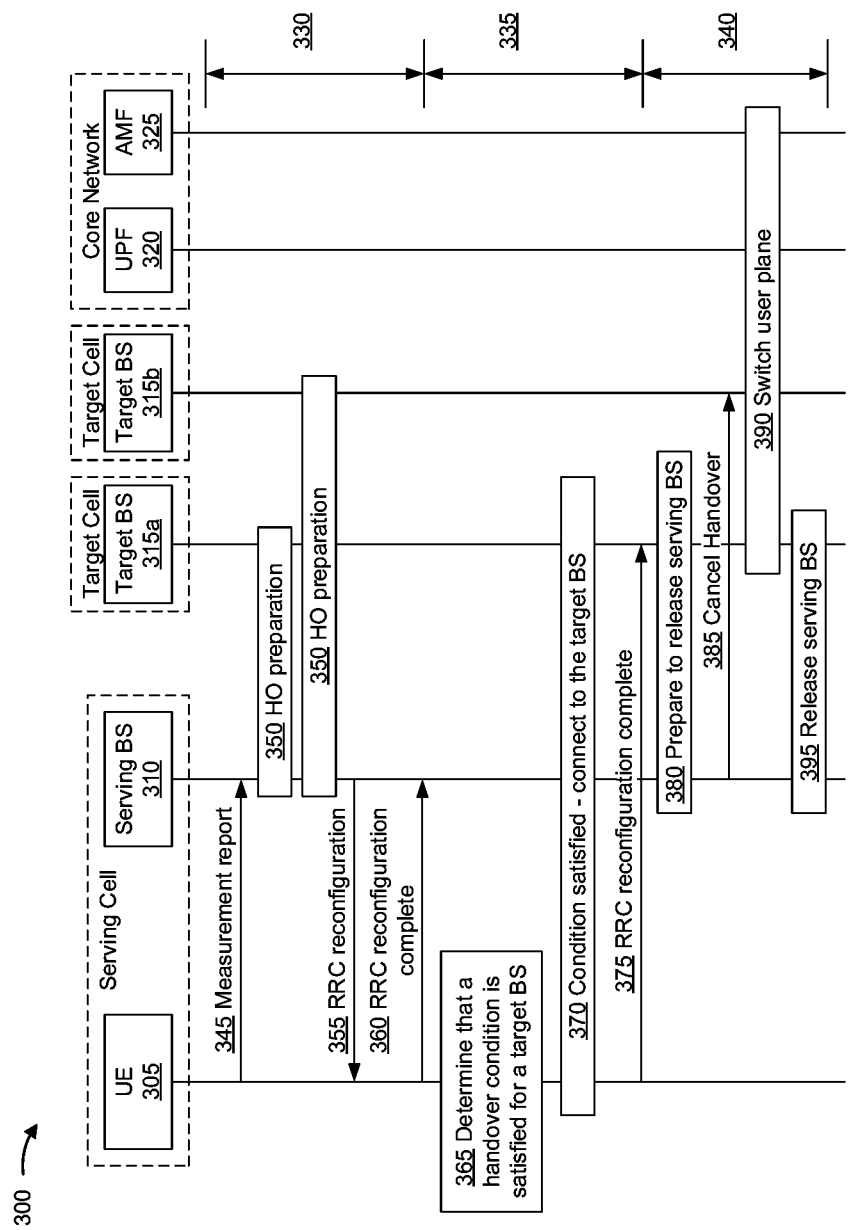
FIG. 3 is a diagram illustrating an example of a handover procedure for handover of a UE, in accordance with various aspects of the present disclosure.

FIG. 3 is a diagram illustrating an example 300 of a handover procedure for handover of a UE, in accordance with various aspects of the present disclosure. In particular, example 300 may be an example of a conditional handover, where the UE is configured with one or more target base stations and one or more handover conditions which, when satisfied, the UE is to execute the handover. In some aspects, a UE may be configured to perform other types of handover procedures, such as a legacy handover procedure (where the UE is to execute a handover based at least in part on being configured with a target base station), a make-before-break handover, a dual active protocol stack (DAPS) handover, and/or other types of handover procedures.

As shown in FIG. 3, the handover procedure may involve a UE 305, a serving base station 310, one or more target base stations 315 (e.g., target base station 315a, target base station 315b), a user plane function (UPF) device 320, and an access and mobility management function (AMF) device 325. The UE 305 may correspond to the UE 120 described elsewhere herein. The serving base station 310 and/or the target base station(s) 315 may correspond to the base station 110 described elsewhere herein. The UPF device 320 and/or the AMF device 325 may correspond to the network controller 130 described elsewhere herein. The UE 305 and the serving base station 310 may be connected (e.g., may have an RRC connection) via a serving cell, and the UE 305 may undergo a handover to a target base station 315 via a target cell. The UPF device 320 and/or the AMF device 325 may be located within a core network such as a 5G core (5GC). The serving base station 310 and the target base station(s) 315 may be in communication with the core network for mobility support and user plane functions.

As shown, the handover procedure may include a handover preparation phase 330, a handover execution phase 335, and a handover completion phase 340. During the handover preparation phase 330, the UE 305 may report measurements that cause the serving base station 310 and/or the target base station(s) 315 to prepare for handover and trigger execution of the handover. During the handover execution phase 335, the UE 305 may execute the handover by performing a random access procedure with a target base station 315 and establishing an RRC connection with the target base station 315. During the handover completion phase 340, the serving base station 310 may forward stored communications associated with the UE 305 to the target base station 315, and the UE 305 may be released from a connection with the serving base station 310.

As shown by reference number 345, the UE 305 may perform one or more measurements, and may transmit a measurement report to the serving base station 310 based at least in part on performing the one or more measurements (e.g., serving cell measurements, neighbor cell measurements, and/or the like). The measurement report may indicate, for example, an RSRP parameter, an RSRQ parameter, an RSSI parameter, a signal-to-interference-plus-noise-ratio (SINR) parameter, and/or the like (e.g., for the serving cell, one or more neighbor cells, and/or the like). The serving base station 310 may use the measurement report to determine whether to configure the UE 305 in preparation for a handover of the UE to the target base station(s) 315. For example, if one or more measurements satisfy a condition, then the serving base station 310 may configure the UE 305 for handover to the target base station(s) 315.

As shown by reference number 350, the serving base station 310 and the target base station(s) 315 may communicate with one another to prepare for a handover of the UE 305. As part of the handover preparation, the serving base station 310 may transmit a handover request to each of the target base station(s) 315 to instruct the target base station(s) 315 to prepare for the handover. The serving base station 310 may communicate RRC context information associated with the UE 305 and/or configuration information associated with the UE 305 to the target base station(s) 315. The target base station 315 may prepare for the handover by reserving resources for the UE 305. After reserving the resources, the target base station(s) 315 may transmit an acknowledgement (ACK) to the serving base station 310 in response to the handover request.

As shown by reference number 355, the serving base station 310 may transmit an RRC reconfiguration communication to the UE 305. The RRC reconfiguration communication may include conditional handover information. In some aspects, the conditional handover information is included in a conditional handover (CHO) configuration. The conditional handover information may identify the target base station(s) 315 (e.g., may include cell identifiers or other types of base station identifiers associated with the target base station(s) 315), may identify one or more handover conditions for handover of the UE 305 (e.g., one or more conditional thresholds, such as signal measurement thresholds for the target base station(s) 315, signal measurement thresholds for the serving base station 310, and/or other conditional thresholds), and/or other types of conditional handover information. The handover command may include additional information associated with the target base station(s) 315, such as a random access channel (RACH) preamble assignment for accessing the target base station(s) 315. As shown by reference number 360, the UE 305 may transmit an RRC reconfiguration complete communication to the source base station 310 to acknowledge the RRC reconfiguration communication.

As shown by reference number 365, during the handover execution phase 335 of the handover procedure, the UE 305 may determine that a handover condition indicated in the RRC reconfiguration communication for a target base station 315 (e.g., target base station 315*a*) is satisfied. This may be referred to as a conditional handover event. As shown by reference number 370, the UE 305 may execute the handover to the target base station 315*a* based at least in part on the handover condition being satisfied for the target base station 315*a*. The UE 305 may execute the handover by performing a random access procedure with the target base station 315*a* (e.g., including synchronization with the target base station 315*a*).

As shown by reference number 375, upon successfully establishing a connection with the target base station 315*a* (e.g., via a random access procedure), the UE 305 may transmit an RRC reconfiguration completion communication to the target base station 315*a*. Reception of the RRC reconfiguration communication by the target base station 315*a* may trigger the start of the handover completion phase 340.

As shown by reference number 380, the serving base station 310 and the target base station 315*a* may communicate with one another to prepare for release of the connection between the serving base station 310 and the UE 305. In some aspects, the target base station 315*a* may determine that a connection between the serving base station 310 and the UE 305 is to be released, such as after receiving the RRC reconfiguration communication from the UE 305. In this case, the target base station 315*a* may transmit a handover connection setup completion communication to the serving base station 310, indicating that the handover of the UE 305 to the target base station 315*a* was successful. The handover connection setup completion communication may cause the serving base station 310 to stop transmitting data to the UE 305 and/or to stop receiving data from the UE 305. Additionally, or alternatively, the handover connection setup completion communication may cause the serving base station 310 to forward communications associated with the UE 305 to the target base station 315*a* and/or to notify the target base station 315*a* of a status of one or more communications with the UE 305. For example, the serving base station 310 may forward, to the target base station 315*a*, buffered downlink communications (e.g., downlink data) for the UE 305 and/or uplink communications (e.g., uplink data) received from the UE 305. Additionally, or alternatively, the serving base station 310 may notify the target base station 315*a* regarding a packet data convergence protocol (PDCP) status associated with the UE 305, a sequence number to be used for a downlink communication with the UE 305, and/or the like.

As shown by reference number 385, the serving base station 310 may transmit an indication to the other target base station(s) 315 (e.g., target base station 315*b*) to cancel the handover with the UE 305. As shown by reference number 390, the target base station 315*a*, the UPF device 320, and/or the AMF device 325 may communicate to switch a user plane path of the UE 305 from the serving base station 310 to the target base station 315*a*. Prior to switching the user plane path, downlink communications for the UE 305 may be routed through the core network to the serving base station 310. After the user plane path is switched, downlink communications for the UE 305 may be routed through the core network to the target base station 315*a*. Upon completing the switch of the user plane path, the AMF device 325 may transmit an end marker communication to the serving base station 310 to signal completion of the user plane path switch. As shown by reference number 395, the target base station 315*a* and the serving base station 310 may communicate to release the serving base station 310.

As indicated above, FIG. 3 is provided as an example. Other examples may differ from what is described with respect to FIG. 3.

In some cases, mobility of a UE may affect the handover performance of a UE. For example, a serving base station may not know whether the UE will travel along a path of travel in the same direction or whether the UE might deviate from the path of travel to travel in another direction. In these cases, mobility-related failures can occur for the UE, such as a radio link failure due to the UE being handed over to a target base station that is not along the path of travel of the UE, or due to a handover procedure for the UE being initiated too late. Moreover, the UE may be handed over too early due to mobility of the UE, thereby increasing a quantity of handover procedures for the UE, which increases the consumption of processing resources, memory resources, battery resources, and/or radio resources for the UE.

Some aspects described herein provide techniques for handover optimization based at least in part on a UE mobility prediction. In some aspects, a UE may determine one or more candidate base stations for handover of the UE based at least in part on a mobility prediction determined by the UE. The mobility prediction may indicate whether the UE is likely to move in and/or through one or more neighboring cells, may indicate an expected arrival time at one or more neighboring cells, may indicate a duration of time that the UE is likely to be in one or more neighboring cells, and/or other predicted or estimated indicators of mobility of the UE. In this way, the UE may provide a more accurate list of candidate base stations (and/or mobility prediction information associated with the candidate base stations) to the serving base station of the UE, which may reduce the likelihood that the serving base station will configure a handover of the UE too early or too late, and/or may reduce the likelihood that the serving base station will configure a target base station for the handover of the UE that may result in a loss of service for the UE.

Figure 4:
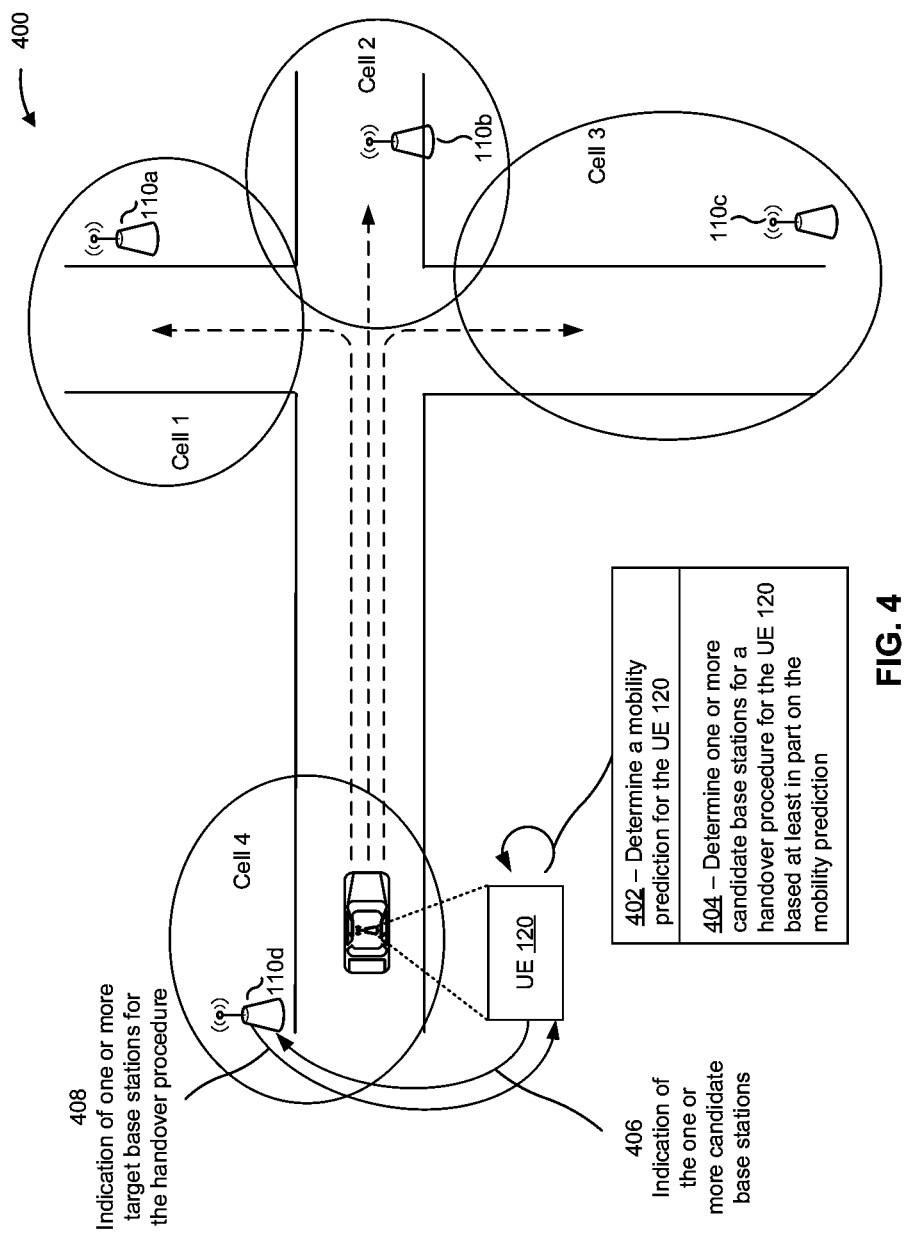
FIGS. 4 and 5 are diagrams illustrating examples associated with handover optimization based at least in part on a UE mobility prediction, in accordance with various aspects of the present disclosure.

FIG. 4 is a diagram illustrating an example 400 associated with handover optimization based at least in part on a UE mobility prediction, in accordance with various aspects of the present disclosure. As shown in FIG. 4, example 400 includes a UE 120 and one or more base stations 110 (e.g., base station 110a, base station 110b, base station 110c, base station 110d, and/or the like). In some aspects, the base stations 110 and the UE 120 may be included in a wireless network, such as wireless network 100. The base stations 110 and the UE 120 may communicate on a wireless access link, which may include an uplink and a downlink.

The base stations 110 may each provide a cell in which wireless communication devices (e.g., UEs) may be served with access to the wireless network. For example, the base station 110a may provide cell 1, the base station 110b may provide cell 2, the base station 110c may provide cell 3, the base station 110d may provide cell 4, and so on. Cells 1-3 may be neighboring cells or cells that are not serving the UE 120. Cell 4 may be a serving cell of the UE 120, in which case the base station 110d is the serving base station of the UE 120.

As shown in FIG. 4, and by reference number 402, the UE 120 may determine a mobility prediction for the UE 120. The mobility prediction may be a prediction or estimation of an expected path of movement of the UE 120. In other words, the mobility prediction may be a prediction or estimation of a direction in which the UE 120 is likely to travel, a path along which the UE 120 is likely to travel, a speed and/or acceleration at which the UE 120 is likely to travel, an estimated movement pattern for the UE 120, and/or the like.

In some aspects, the mobility prediction may be a determination of a probability or a likelihood that the UE 120 will encounter one or more base stations 110 (e.g., one or more of base stations 110a, 110b, and/or 110c). The probability or a likelihood that the UE 120 will encounter the one or more base stations 110 may be a determination of whether the UE 120 will move into one or more cells (e.g., one or more neighboring cells such as cells 1-3 and/or other cells) associated with the one or more base stations 110. As an example, the mobility prediction for the UE 120 may indicate a probability or a likelihood that the UE 120 will move into cell 1 of base station 110a, a probability or a likelihood that the UE 120 will move into cell 2 of base station 110b, a probability or a likelihood that the UE 120 will move into cell 3 of base station 110c, and so on. In some aspects, the mobility prediction may indicate a probability or a likelihood that the UE 120 will move into a particular cell within a particular time period. In some aspects, the mobility prediction may indicate a confidence level for a probability or a likelihood that the UE 120 will move into a particular cell. In some aspects, the mobility prediction may indicate an expected arrival time in a particular cell. In some aspects, the mobility prediction may indicate an expected time duration for which the UE 120 will remain in a particular cell. In some aspects, the mobility prediction may indicate one or more candidate route identifiers (e.g., an identifier of a route or a communication path for traffic to and/or from the UE 120) for the UE 120. In some aspects, the mobility prediction may indicate a probability or a likelihood that a route associated with a particular candidate route identifier will be used by the UE 120 at a particular point in time. In some aspects, the mobility prediction may indicate combinations of the above parameters and/or other parameters of expected, predicted, and/or estimated mobility of the UE 120.

The UE 120 may determine the mobility prediction based at least in part on various inputs, various parameters, and/or other types of data. In some aspects, the UE 120 may determine the mobility prediction based at least in part on signal measurements, pathloss measurements, distance measurements, and/or other types of cell measurements of signals from nearby cells. For example, the UE 120 may determine that the UE 120 is moving closer or further away from a cell based at least in part on cell measurements associated with signals from the cell.

In some aspects, the UE 120 may determine the mobility prediction based at least in part on sensor data from one or more sensors (e.g., sensor(s) 286) of the UE 120. For example, the UE 120 may determine a path of travel of the UE 120 based at least in part on GPS navigation data, may determine that the UE 120 is accelerating in a particular direction based at least in part on accelerometer data, may determine that the UE 120 is facing a particular direction based at least in part on gyroscope data, and/or the like.

In some aspects, the UE 120 may determine the mobility prediction based at least in part on historical mobility information for the UE 120. The historical mobility information may include information identifying previously traveled paths for the UE 120, previous navigation destinations of the UE 120, frequency of paths traveled by the UE 120, routes and/or points of interest saved by the UE 120, times of day that the UE 120 traveled along a particular path and/or to a particular destination, and/or the like.

In some aspects, the UE 120 may determine the mobility prediction based at least in part on a type of travel. For example, the mobility prediction may be based at least in part on the UE 120 being located in a vehicle, based at least in part on the UE 120 be associated with a pedestrian, and/or the like.

In some aspects, the UE 120 may determine the mobility prediction based at least in part on a combination of the above inputs, parameters, and/or data, and/or other types of inputs, parameters, and/or data. As an example of the above, the UE 120 may determine the mobility prediction to include a 0.8 probability that the UE 120 will travel into cell 1 to a work destination, a 0.15 probability that the UE 120 will travel into cell 2 to a restaurant, and a probability that the UE 120 will travel into cell 3 to a home destination based at least in part on a direction of travel of a vehicle associated with the UE 120, based at least in part on a time of day, and based at least in part on the UE 120 historically traveling to the work destination at the time of day.

As further shown in FIG. 4, and by reference number 404, the UE 120 may determine one or more candidate base stations for a handover procedure for the UE 120. The one or more candidate base stations may include one or more neighboring base stations of the serving base station (e.g., base station 110*d*) of the UE 120, such as base station 110*a*, base station 110*b*, base station 110*c*, and/or other neighboring base stations, and/or may include non-neighboring base stations.

In some aspects, the UE 120 determines a plurality of candidate base stations, such as in the case that the handover procedure is a conditional handover procedure (such as the example conditional handover procedure described above in connection with FIG. 3). In some aspects, the UE 120 determines a single candidate base station, such as in the case that the handover procedure is a legacy handover procedure, a make-before-break handover procedure, or a DAPS handover procedure.

In some aspects, the UE 120 may determine the one or more candidate base stations based at least in part on the mobility prediction. In some aspects, the UE 120 determines each candidate base station based at least in part on a respective probability, included in the mobility prediction, that the UE 120 will encounter the candidate base station. For example, the UE 120 may determine a candidate base station based at least in part on determining that the probability that the UE 120 will encounter the candidate base station satisfies a probability threshold.

In some aspects, the probability threshold may be based at least in part on a UE capability associated with the UE 120. In some aspects, the UE 120 may receive an indication of the probability threshold from the serving base station. For example, the UE 120 may transmit an indication of the UE capability to the serving base station. The serving base station may determine the probability threshold based at least in part on the UE capability, and may transmit an indication of the probability threshold to the UE 120.

In some aspects, where the handover procedure is a legacy handover, a DAPS handover, or a make-before-break handover, the UE 120 may determine a single candidate base station based at least in part on the mobility prediction, in addition to one or more signal measurements (e.g., RSRP measurements, RSRQ measurements, SINR measurements, radio resource management (RRM) measurements, and/or other types of signal measurements) for the single candidate base station, a cell coverage parameter for the single candidate base station, a cell overlapping parameter for the single candidate base station, and/or based on other parameters.

As further shown in FIG. 4, and by reference number 406, the UE 120 may transmit an indication of the one or more candidate base stations to the serving base station in an uplink communication. The uplink communication may include a UE assistance information (UEAssistanceInformation) communication, an RRC communication repurposed to indicate the one or more candidate base stations, an RRC communication specifically configured for indicating candidate base stations and/or other mobility prediction related information, a mobility prediction communication (e.g., a ueMobilityPrediction report), and/or another type of uplink communication.

In some aspects, the UE 120 transmits the uplink communication to the serving base station prior to a handover preparation phase (e.g., handover preparation phase 330) in the handover procedure. In some aspects, the UE 120 transmits the uplink communication to the serving base station during the handover preparation phase. In these examples, the UE 120 may transmit the uplink communication to the serving base station prior to receiving an RRC reconfiguration communication (e.g., as described above in connection with reference number 355 of FIG. 3) during the handover preparation phase. In some aspects, the UE 120 transmits the UE assistance information in a measurement report during the handover preparation phase (e.g., as described above in connection with reference number 345 of FIG. 3).

The UE 120 may include the indication of the one or more candidate base stations in UE assistance information in the uplink communication. The indication of the one or more candidate base stations may include an explicit indication of the cell identifiers or base station identifiers associated with the one or more candidate base stations. The UE assistance information may further include an indication of the mobility prediction or one or more parameters of the mobility prediction. For example, the UE assistance information may further include an indication of the respective probabilities that the UE 120 will encounter each of the one or more candidate base stations, may include an indication of respective timings that the UE 120 will travel into the cells of the one or more candidate base stations, may include an indication of respective time durations that the UE 120 will be located in the cells of each of the one or more candidate base stations, and/or other parameters.

In some aspects, the UE assistance information includes an indication of respective timings for adding each of the one or more candidate base stations to a target base station list associated with the UE. In these examples, the serving base station may add the one or more candidate base stations to the target base station list based at least in part on the indication, may perform target base station handover preparation based at least in part on the indication, and/or may perform other actions based at least in part on the indication.

In aspects where the UE 120 transmits an indication of the mobility prediction to the serving base station, the UE 120 may autonomously transmit the indication of the mobility prediction without input from the serving base station or may transmit the indication of the mobility prediction based at least in part on receiving a request for the mobility prediction. For example, the UE 120 may transmit an indication to the serving base station that the mobility prediction for the UE 120 is available, the serving base station may receive the indication and may transmit a request to the UE 120 to transmit the mobility prediction based at least in part on the indication, and the UE 120 may transmit the indication of the mobility prediction to the serving base station based at least in part on receiving the request. The indication of the mobility prediction may be included in the UE assistance information, may be included in the measurement report during the handover preparation phase, may be included in another communication, or a combination thereof.

In some aspects, the UE 120 transmits the indication of the one or more candidate base stations, the indication of the mobility prediction, and/or the measurement report based at least in part on the occurrence of an event or based at least in part on determining that a condition is satisfied. For example, the UE 120 may transmit the indication of the one or more candidate base stations, the indication of the mobility prediction, and/or the measurement report based at least in part on determining that a probability threshold for the one or more candidate base stations is satisfied. As indicated above, the probability threshold may be configured by the serving base station and may be based at least in part on the UE capability of the UE 120.

In some aspects, the serving base station may further configure one or more time intervals or periodicities for updating the one or more candidate base stations, the mobility prediction, and/or the measurement report. The one or more time intervals or periodicities may also be based at least in part on the UE capability of the UE 120. In these examples, the UE 120 may periodically transmit updates to the serving base station based at least in part on the one or more time intervals or periodicities to update the one or more candidate base stations, the mobility prediction, and/or the measurement report. In some aspects, the UE 120 continues to transmit updates to the one or more candidate base stations, the mobility prediction, and/or the measurement report based at least in part on the one or more time intervals or periodicities prior to and/or until the RRC reconfiguration communication is received during the handover preparation phase of the handover procedure.

In some aspects, the serving base station configures and transmits the measurement objects for the measurement report, the information elements for the measurement report, and/or the particular time interval for transmitting the measurement report to the UE 120. In some aspects, the serving base station configures and transmits the measurement objects for the measurement report, the information elements for the measurement report, and/or the particular time interval for transmitting the measurement report based at least in part on the UE assistance information received from the UE 120.

The serving base station may receive the indication of the one or more target base stations from the UE 120. In some aspects, the serving base station further receives the indication of the mobility prediction (or one or more parameters of the mobility prediction) and/or the measurement report from the UE 120 (e.g., based at least in part on the occurrence of an event, based at least in part on a condition being satisfied, and/or based at least in part on a particular time interval).

As further shown in FIG. 4, and by reference number 408, the serving base station may transmit an indication of one or more target base stations for the handover procedure to the UE 120. In some aspects, the serving base station may transmit the indication of the one or more target base stations based at least in part on receiving the UE assistance information from the UE 120, based at least in part on receiving the measurement report from the UE 120 during the handover preparation phase of the handover procedure, based at least in part on other factors, or a combination thereof.

In some aspects, the serving base station transmits the indication of the one or more target base stations to the UE 120 in the RRC reconfiguration communication during the handover preparation phase of the handover procedure (e.g., as described above in connection with reference number 355 of FIG. 3). The serving base station may transmit the RRC reconfiguration communication after communicating with the one or more target base stations in preparation for a handover of the UE 120 (e.g., as described above in connection with reference number 350 of FIG. 3).

In some aspects, the serving base station may determine the one or more target base stations based at least in part on the indication of the one or more candidate base stations, based at least in part on the indication of the mobility prediction, based at least in part on the measurement report, based at least in part on other information, or a combination thereof.

In some aspects, the one or more target base stations are among the one or more candidate base stations indicated by the UE 120 in the UE assistance information. In some aspects, at least a subset of the one or more target base stations are different from the one or more candidate base stations indicated by the UE 120.

In some aspects, the one or more target base stations include a single target base station. In these examples, if a handover condition is satisfied for the target base station, and the UE 120 determines that the probability that the UE 120 will encounter the target base station is less than a probability that the UE 120 will encounter another candidate base station indicated by the UE 120, the UE 120 may refrain from performing the handover procedure with the target base station (e.g., may refrain from completing the handover execution phase 335 of the handover procedure, as described above in connection with FIG. 3). In some aspects, if a handover condition is satisfied for the target base station, and the UE 120 determines that the probability that the UE 120 will encounter the target base station satisfies a probability threshold and/or is a highest probability among the one or more candidate base stations, the UE 120 may complete the handover execution phase with the target base station. In some aspects, the UE 120 performs the handover procedure with the target base station regardless of whether the probability that the UE 120 will encounter the target base station satisfies a probability threshold and/or is a highest probability among the one or more candidate base stations.

In some aspects, the one or more target base stations include a plurality of target base stations. In these examples, the UE 120 may identify a target base station among the plurality of target base stations based at least in part on the probability that the UE will encounter the target base station. For example, the UE 120 may identify a target base station among the plurality of target base stations based at least in part on determining that the probability that the UE will encounter the target base station satisfies a probability threshold. As another example, the UE 120 may identify a target base station among the plurality of target base stations based at least in part on determining that the probability that the UE will encounter the target base station is a highest probability among the plurality of target base stations.

In some aspects, the UE 120 determines one or more parameters for the handover procedure based at least in part on the probability associated with the identified target base station. The one or more parameters may include a RACH preamble, a RACH occasion, a beam, a time-domain resource and/or a frequency-domain resource in which the UE 120 is to initiate a random access procedure with the target base station, and/or other parameters.

As indicated above, FIG. 4 is provided as an example. Other examples may differ from what is described with respect to FIG. 4.

Figure 5:
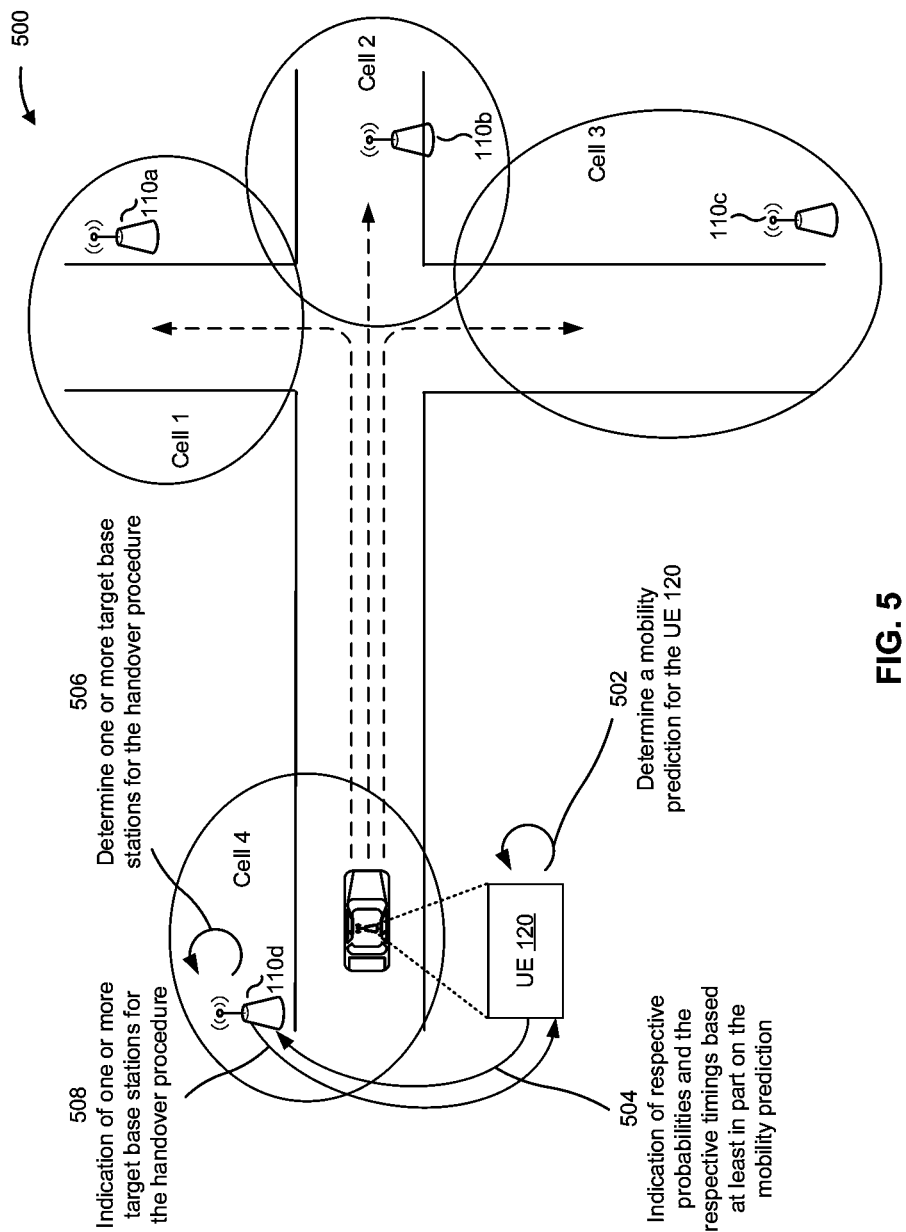

FIG. 5 is a diagram illustrating an example 500 associated with handover optimization based at least in part on a UE mobility prediction, in accordance with various aspects of the present disclosure. As shown in FIG. 5, example 500 includes a UE 120 and one or more base stations 110 (e.g., base station 110*a*, base station 110*b*, base station 110*c*, base station 110*d*, and/or the like). In some aspects, the base stations 110 and the UE 120 may be included in a wireless network, such as wireless network 100. The base stations 110 and the UE 120 may communicate on a wireless access link, which may include an uplink and a downlink.

The base stations 110 may each provide a cell in which wireless communication devices (e.g., UEs) may be served with access to the wireless network. For example, the base station 110*a* may provide cell 1, the base station 110*b* may provide cell 2, the base station 110*c* may provide cell 3, the base station 110*d* may provide cell 4, and so on. Cells 1-3 may be neighboring cells or cells that are not serving the UE 120. Cell 4 may be a serving cell of the UE 120, in which case the base station 110*d* is the serving base station of the UE 120.

As shown in FIG. 5, and by reference number 502, the UE 120 may determine a mobility prediction for the UE 120. The mobility prediction may be a prediction or estimation of an expected path of movement of the UE 120. In some aspects, the mobility prediction may be a determination of a probability or a likelihood that the UE 120 will encounter one or more base stations 110 (e.g., one or more of base stations 110*a*, 110*b*, and/or 110*c*). In some aspects, the UE 120 determines the mobility prediction for the UE 120 using one or more techniques described above in connection with FIG. 4.

As further shown in FIG. 5, and by reference number 504, the UE 120 may transmit an indication of the mobility prediction (or one or more parameters included therein) to the serving base station (e.g., to the base station 110*d*). In these examples, the UE 120 transmits the indication of the mobility prediction (or one or more parameters included therein) to the serving base station without providing an indication of one or more candidate base stations for a handover procedure for the UE 120.

The UE 120 may transmit the indication of the mobility prediction (or one or more parameters included therein) to the serving base station in an uplink communication. The uplink communication may include a UE assistance information (UEAssistanceInformation) communication, an RRC communication, a mobility prediction communication (e.g., a ueMobilityPrediction report), and/or another type of uplink communication.

In some aspects, the UE 120 transmits the uplink communication to the serving base station prior to a handover preparation phase (e.g., handover preparation phase 330) in the handover procedure. In some aspects, the UE 120 transmits the uplink communication to the serving base station during the handover preparation phase. In these examples, the UE 120 may transmit the uplink communication to the serving base station prior to receiving an RRC reconfiguration communication (e.g., as described above in connection with reference number 355 of FIG. 3) during the handover preparation phase. In some aspects, the UE 120 transmits the UE assistance information in a measurement report during the handover preparation phase (e.g., as described above in connection with reference number 345 of FIG. 3).

The UE 120 may include the indication of the mobility prediction (or one or more parameters included therein) in UE assistance information in the uplink communication. The indication of the mobility prediction (or one or more parameters included therein) may include an indication of the respective probabilities that the UE 120 will encounter each of one or more candidate base stations, may include an indication of respective timings that the UE 120 will travel into the cells of the one or more candidate base stations, may include an indication of respective time durations that the UE 120 will be located in the cells of each of the one or more candidate base stations, and/or other parameters.

In some aspects, the UE assistance information includes an indication of respective timings for adding each of the one or more candidate base stations to a target base station list associated with the UE. In these examples, the serving base station may add the one or more candidate base stations to the target base station list based at least in part on the indication, may perform target base station handover preparation based at least in part on the indication, and/or may perform other actions based at least in part on the indication.

In some aspects, the UE 120 further transmits a measurement report to the serving base station, as described above in connection with reference number 345 of FIG. 3. The measurement report may include one or more signal measurements associated with the one or more candidate base stations, such as RSRP measurements, RSRQ measurements, SINR measurements, RRM measurements, and/or other types of signal measurements. In some aspects, the UE 120 transmits the indication of the mobility prediction (or one or more parameters included therein) and/or the measurement report based at least in part on the occurrence of an event or based at least in part on determining that a condition is satisfied. For example, the UE 120 may transmit the indication of the mobility prediction (or one or more parameters included therein) and/or the measurement report based at least in part on determining that a probability threshold for the one or more candidate base stations is satisfied. As indicated above, the probability threshold may be configured by the serving base station and may be based at least in part on the UE capability of the UE 120.

In some aspects, the serving base station may further configure one or more time intervals or periodicities for updating the mobility prediction (or one or more parameters included therein) and/or the measurement report. The one or more time intervals or periodicities may also be based at least in part on the UE capability of the UE 120. In these examples, the UE 120 may periodically transmit updates to the serving base station based at least in part on the one or more time intervals or periodicities to update the mobility prediction (or one or more parameters included therein) and/or the measurement report. In some aspects, the UE 120 continues to transmit updates to the mobility prediction (or one or more parameters included therein) and/or the measurement report based at least in part on the one or more time intervals or periodicities prior to and/or until the RRC reconfiguration communication is received during the handover preparation phase of the handover procedure.

As further shown in FIG. 5, and by reference number 506, the serving base station may receive the indication of the mobility prediction (or one or more parameters included therein) and/or the measurement report from the UE 120, and may determine one or more target base stations for the handover procedure for the UE 120 based at least in part on the respective probabilities for the one or more candidate base stations, the respective timings for the one or more candidate base stations, and/or the measurement report.

In some aspects, the one or more target base stations are among the one or more candidate base stations associated with the mobility prediction (or the one or more parameters included therein) and/or the measurement report. In some aspects, at least a subset of the one or more target base stations are different from the one or more candidate base stations.

In some aspects, the serving base station dynamically determines one or more parameters for the handover procedure based at least in part on the respective probabilities associated with the one or more candidate base stations and/or the identified target base station. The one or more parameters may include a RACH preamble, a RACH occasion, a beam, a time-domain resource and/or a frequency-domain resource in which the UE 120 is to initiate a random access procedure with the target base station, and/or other parameters. In some aspects, the one or more parameters may be further based at least in part on the measurement report, the outcomes or success rate of previous handover procedures for the UE 120, and/or other factors.

As further shown in FIG. 5, and by reference number 508, the serving base station may transmit an indication of one or more target base stations for the handover procedure to the UE 120. In some aspects, the serving base station may transmit the indication of the one or more target base stations based at least in part on receiving the UE assistance information from the UE 120, based at least in part on receiving the measurement report from the UE 120 during the handover preparation phase of the handover procedure, based at least in part on other factors, or a combination thereof.

In some aspects, the serving base station transmits the indication of the one or more target base stations to the UE 120 in the RRC reconfiguration communication during the handover preparation phase of the handover procedure (e.g., as described above in connection with reference number 355 of FIG. 3). The serving base station may transmit the RRC reconfiguration communication after communicating with the one or more target base stations in preparation for a handover of the UE 120 (e.g., as described above in connection with reference number 350 of FIG. 3).

The serving base station may further transmit an indication of the one or more parameters for the handover to the UE 120. In some aspects, the serving base station transmits an indication of a mapping function for the one or more parameters, such that the UE 120 is enabled to determine the one or more parameters based at least in part on the mapping function and the respective probabilities for each of the one or more candidate base stations.

As indicated above, FIG. 5 is provided as an example. Other examples may differ from what is described with respect to FIG. 5.

Figure 6:
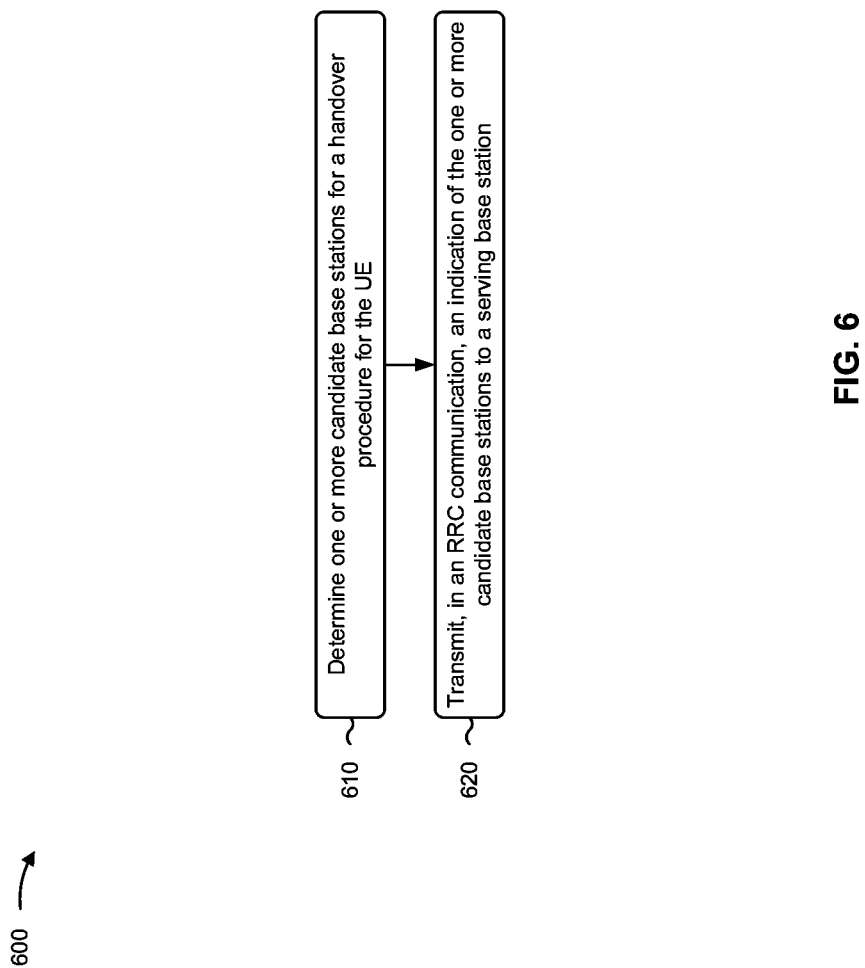
FIGS. 6-9 are diagrams illustrating example processes associated with handover optimization based at least in part on a UE mobility prediction, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, UE 305) performs operations associated with handover optimization based on a UE mobility prediction.

As shown in FIG. 6, in some aspects, process 600 may include determining one or more candidate base stations for a handover procedure for the UE (block 610). For example, the UE (e.g., using determination component 1008, depicted in FIG. 10) may determine one or more candidate base stations for a handover procedure for the UE, as described above.

As further shown in FIG. 6, in some aspects, process 600 may include transmitting, in An RRC communication, an indication of the one or more candidate base stations to a serving base station (block 620). For example, the UE (e.g., using transmission component 1004, depicted in FIG. 10) may transmit, in An RRC communication, an indication of the one or more candidate base stations to a serving base station, as described above.

Process 600 may include additional aspects, such as any single aspect or any combination of aspects described below and/or in connection with one or more other processes described elsewhere herein.

In a first aspect, determining the one or more candidate base stations comprises determining the one or more candidate base stations based at least in part on a mobility prediction for the UE. In a second aspect, alone or in combination with the first aspect, the indication of the one or more candidate base stations comprises an indication of a respective base station identifier for each of the one or more candidate base stations, and the RRC communication further comprises at least one of an indication of a respective probability, based at least in part on the mobility prediction, that the UE will encounter each of the one or more candidate base stations, or an indication of a respective timing, based at least in part on the mobility prediction, for adding each of the one or more candidate base stations to a target base station list associated with the UE.

In a third aspect, alone or in combination with one or more of the first and second aspects, transmitting the indication of the one or more candidate base stations to the serving base station comprises transmitting the indication of the one or more candidate base stations to the serving base station based at least in part on determining that respective probabilities, based at least in part on the mobility prediction, that the UE will encounter each of the one or more candidate base stations satisfy a probability threshold. In a fourth aspect, alone or in combination with one or more of the first through third aspects, process 600 includes transmitting (e.g., using transmission component 1004, depicted in FIG. 10), to the serving base station, an indication of a UE capability associated with the UE, and receiving (e.g., using reception component 1002, depicted in FIG. 10), based at least in part on the UE capability, an indication of the probability threshold from the serving base station.

In a fifth aspect, alone or in combination with one or more of the first through fourth aspects, process 600 includes transmitting (e.g., using transmission component 1004, depicted in FIG. 10), to the serving base station, an indication that the mobility prediction for the UE is available (e.g., using reception component 1002, depicted in FIG. 10) from the serving base station, and based at least in part on transmitting the indication that the mobility prediction for the UE is available, an indication to transmit the mobility prediction for the UE to the serving base station, and transmitting (e.g., using transmission component 1004, depicted in FIG. 10), to the serving base station and based at least in part on receiving the indication to transmit the mobility prediction for the UE, an indication of the mobility prediction for the UE.

In a sixth aspect, alone or in combination with one or more of the first through fifth aspects, the indication of the mobility prediction for the UE is included in the RRC communication or a measurement report associated with the one or more candidate base stations. In a seventh aspect, alone or in combination with one or more of the first through sixth aspects, process 600 includes updating (e.g., using updating component 1010, depicted in FIG. 10) the indication of the mobility prediction for the UE based at least in part on a particular time interval indicated by the serving base station. In an eighth aspect, alone or in combination with one or more of the first through seventh aspects, determining the one or more candidate base stations for the handover procedure for the UE comprises determining a single candidate base station based at least in part on at least one of one or more signal measurements for the single candidate base station, or a cell coverage parameter for the single candidate base station with an indication of the UE mobility prediction.

In a ninth aspect, alone or in combination with one or more of the first through eighth aspects, process 600 includes receiving (e.g., using reception component 1002, depicted in FIG. 10), from the serving base station, an indication of a plurality of target base stations for the handover procedure for the UE, wherein the plurality of target base stations are included among the one or more candidate base stations, and identifying (e.g., using identification component 1012, depicted in FIG. 10) a target base station of the plurality of target base stations based at least in part on a probability that the UE will encounter the target base station. In a tenth aspect, alone or in combination with one or more of the first through ninth aspects, receiving the indication of the plurality of target base stations comprises receiving the indication of the plurality of target base stations based at least in part on respective probabilities that the UE will encounter each of the plurality of target base stations satisfying a probability threshold.

In an eleventh aspect, alone or in combination with one or more of the first through tenth aspects, process 600 includes determining (e.g., using determination component 1008, depicted in FIG. 10) one or more parameters for the handover procedure for the UE based at least in part on the probability. In a twelfth aspect, alone or in combination with one or more of the first through eleventh aspects, process 600 includes receiving (e.g., using reception component 1002, depicted in FIG. 10), from the serving base station, an indication of a target base station for the handover procedure for the UE, wherein the target base station is included among the one or more candidate base stations, determining (e.g., using determination component 1008, depicted in FIG. 10) that a first probability that the UE will encounter the target base station is less than a second probability that the UE will encounter another candidate base station of the one or more candidate base stations, and refraining from performing the handover procedure with the target base station based at least in part on determining that the first probability is less than the second probability.

In a thirteenth aspect, alone or in combination with one or more of the first through twelfth aspects, the handover procedure for the UE comprises a conditional handover procedure, a legacy handover procedure, or a DAPS handover procedure. In a fourteenth aspect, alone or in combination with one or more of the first through thirteenth aspects, the RRC communication includes at least one of a UEAssistanceInformation communication or a mobility prediction communication. In a fifteenth aspect, alone or in combination with one or more of the first through fourteenth aspects, process 600 includes transmitting (e.g., using transmission component 1004, depicted in FIG. 10), to the serving base station, a measurement report associated with the one or more candidate base stations, and receiving (e.g., using reception component 1002, depicted in FIG. 10), from the serving base station, an indication of one or more target base stations for the handover procedure for the UE, wherein the one or more target base stations are based at least in part on at least one of the indication of the one or more candidate base stations, or the measurement report.

In a sixteenth aspect, alone or in combination with one or more of the first through fifteenth aspects, transmitting the measurement report comprises transmitting the measurement report based at least in part on a particular time interval indicated by the serving base station. In a seventeenth aspect, alone or in combination with one or more of the first through sixteenth aspects, transmitting the indication of the one or more candidate base stations to the serving base station comprises updating, at a particular time interval, the indication of the one or more candidate base stations prior to reception of an RRC reconfiguration communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
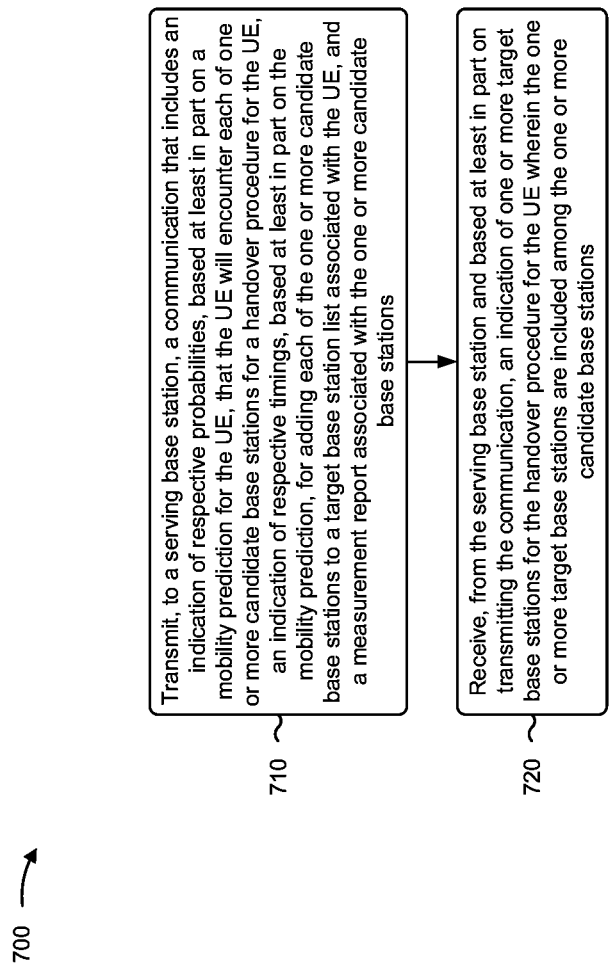

FIG. 7 is a diagram illustrating an example process 700 performed, for example, by a UE, in accordance with various aspects of the present disclosure. Example process 700 is an example where the UE (e.g., UE 120, UE 305) performs operations associated with handover optimization based on a UE mobility prediction.

As shown in FIG. 7, in some aspects, process 700 may include transmitting, to a serving base station, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations (block 710). For example, the UE (e.g., using transmission component 1104, depicted in FIG. 11) may transmit, to a serving base station, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations, as described above.

As further shown in FIG. 7, in some aspects, process 700 may include receiving, from the serving base station and based at least in part on transmitting the communication, an indication of one or more target base stations for the handover procedure for the UE, wherein the one or more target base stations are included among the one or more candidate base stations (block 720). For example, the UE (e.g., using reception component 1102, depicted in FIG. 11) may receive, from the serving base station and based at least in part on transmitting the communication, an indication of one or more target base stations for the handover procedure for the UE, as described above. In some aspects, the one or more target base stations are included among the one or more candidate base stations.

Process 700 may include additional aspects, such as any single aspect or any combination of aspects described below and/or in connection with one or more other processes described elsewhere herein.

In a first aspect, process 700 includes receiving (e.g., using reception component 1102, depicted in FIG. 11), from the serving base station, an indication of one or more handover parameters, for the handover procedure for the UE, that are based at least in part on at least one of the respective probabilities, the respective timings, the measurement report, or an outcome of a previous handover procedure for the UE. In a second aspect, alone or in combination with the first aspect, transmitting the communication comprises transmitting the communication based at least in part on a time interval, indicated by the serving base station, for a measurement report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
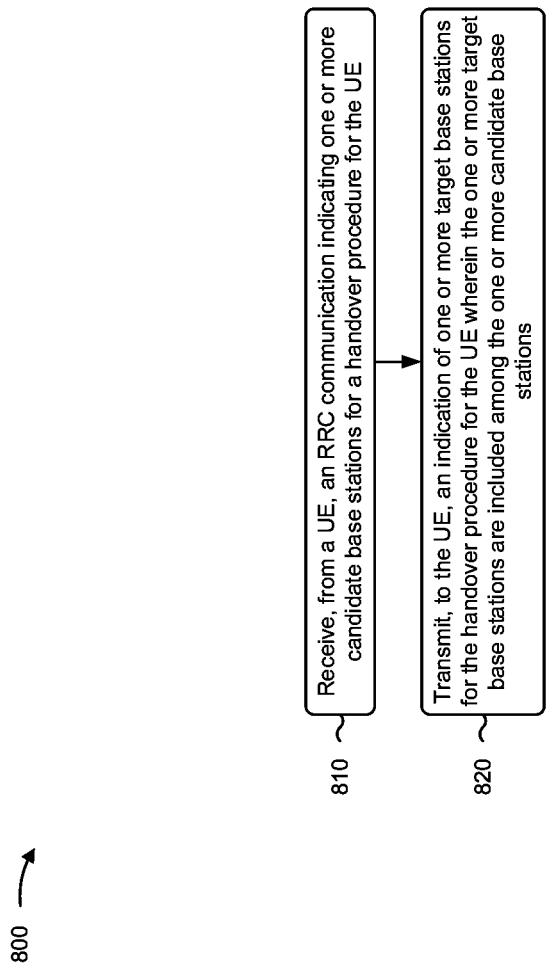

FIG. 8 is a diagram illustrating an example process 800 performed, for example, by a base station, in accordance with various aspects of the present disclosure. Example process 800 is an example where the base station (e.g., base station 110, serving base station 310) performs operations associated with handover optimization based on a UE mobility prediction.

As shown in FIG. 8, in some aspects, process 800 may include receiving, from a UE, An RRC communication indicating one or more candidate base stations for a handover procedure for the UE (block 810). For example, the base station (e.g., using reception component 1202, depicted in FIG. 12) may receive, from a UE, An RRC communication indicating one or more candidate base stations for a handover procedure for the UE, as described above.

As further shown in FIG. 8, in some aspects, process 800 may include transmitting, to the UE, an indication of one or more target base stations for the handover procedure for the UE, wherein the one or more target base stations are included among the one or more candidate base stations (block 820). For example, the base station (e.g., using transmission component 1204, depicted in FIG. 12) may transmit, to the UE, an indication of one or more target base stations for the handover procedure for the UE, as described above. In some aspects, the one or more target base stations are included among the one or more candidate base stations.

Process 800 may include additional aspects, such as any single aspect or any combination of aspects described below and/or in connection with one or more other processes described elsewhere herein.

In a first aspect, the one or more candidate base stations are based at least in part on a mobility prediction for the UE. In a second aspect, alone or in combination with the first aspect, process 800 includes receiving (e.g., using reception component 1202, depicted in FIG. 12), from the UE, an indication of a UE capability associated with the UE, and transmitting (e.g., using transmission component 1204, depicted in FIG. 12), based at least in part on the UE capability, an indication of a probability threshold, wherein receiving the RRC communication comprises receiving the RRC communication based at least in part on respective probabilities, that the UE will encounter each of the one or more candidate base stations, satisfying the probability threshold.

In a third aspect, alone or in combination with one or more of the first and second aspects, process 800 includes receiving (e.g., using reception component 1202, depicted in FIG. 12), from the UE, a measurement report associated with the one or more candidate base stations, and determining (e.g., using determination component 1208, depicted in FIG. 12) the one or more target base stations based at least in part on at least one of the indication of the one or more candidate base stations, or the measurement report.

In a fourth aspect, alone or in combination with one or more of the first through third aspects, process 800 includes transmitting (e.g., using transmission component 1204, depicted in FIG. 12), to the UE, an indication of a particular time interval for transmitting the measurement report, and receiving the measurement report comprises receiving the measurement report based at least in part on the particular time interval.

In a fifth aspect, alone or in combination with one or more of the first through fourth aspects, process 800 includes receiving (e.g., using reception component 1202, depicted in FIG. 12), from the UE, an indication that the mobility prediction for the UE is available, transmitting (e.g., using transmission component 1204, depicted in FIG. 12), to the UE and based at least in part on receiving the indication that the mobility prediction for the UE is available, an indication to transmit the mobility prediction for the UE to the serving base station, and receiving (e.g., using reception component 1202, depicted in FIG. 12), from the UE and based at least in part on receiving the indication to transmit the mobility prediction for the UE, an indication of the mobility prediction for the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
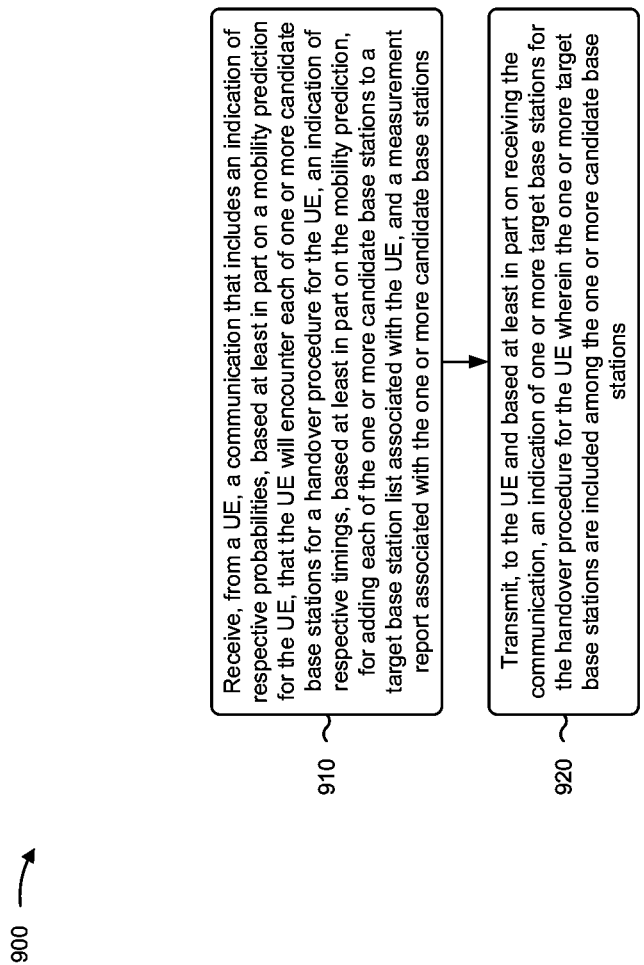

FIG. 9 is a diagram illustrating an example process 900 performed, for example, by a base station, in accordance with various aspects of the present disclosure. Example process 900 is an example where the base station (e.g., base station 110) performs operations associated with handover optimization based on a UE mobility prediction.

As shown in FIG. 9, in some aspects, process 900 may include receiving, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations (block 910). For example, the base station (e.g., using reception component 1302, depicted in FIG. 13) may receive, from a UE, a communication that includes an indication of respective probabilities, based at least in part on a mobility prediction for the UE, that the UE will encounter each of one or more candidate base stations for a handover procedure for the UE, an indication of respective timings, based at least in part on the mobility prediction, for adding each of the one or more candidate base stations to a target base station list associated with the UE, and a measurement report associated with the one or more candidate base stations, as described above.

As further shown in FIG. 9, in some aspects, process 900 may include transmitting, to the UE and based at least in part on receiving the communication, an indication of one or more target base stations for the handover procedure for the UE, wherein the one or more target base stations are included among the one or more candidate base stations (block 920). For example, the base station (e.g., using transmission component 1304, depicted in FIG. 13) may transmit, to the UE and based at least in part on receiving the communication, an indication of one or more target base stations for the handover procedure for the UE, as described above. In some aspects, the one or more target base stations are included among the one or more candidate base stations.

Process 900 may include additional aspects, such as any single aspect or any combination of aspects described below and/or in connection with one or more other processes described elsewhere herein.

In a first aspect, process 900 includes determining (e.g., using determination component 1308, depicted in FIG. 13) one or more handover parameters, for the handover procedure for the UE, that are based at least in part on at least one of the respective probabilities, the respective timings, the measurement report, or an outcome of a previous handover procedure for the UE, and transmitting an indication of the one or more handover parameters to the UE. In a second aspect, alone or in combination with the first aspect, receiving the communication comprises receiving the communication based at least in part on a time interval for a measurement report.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
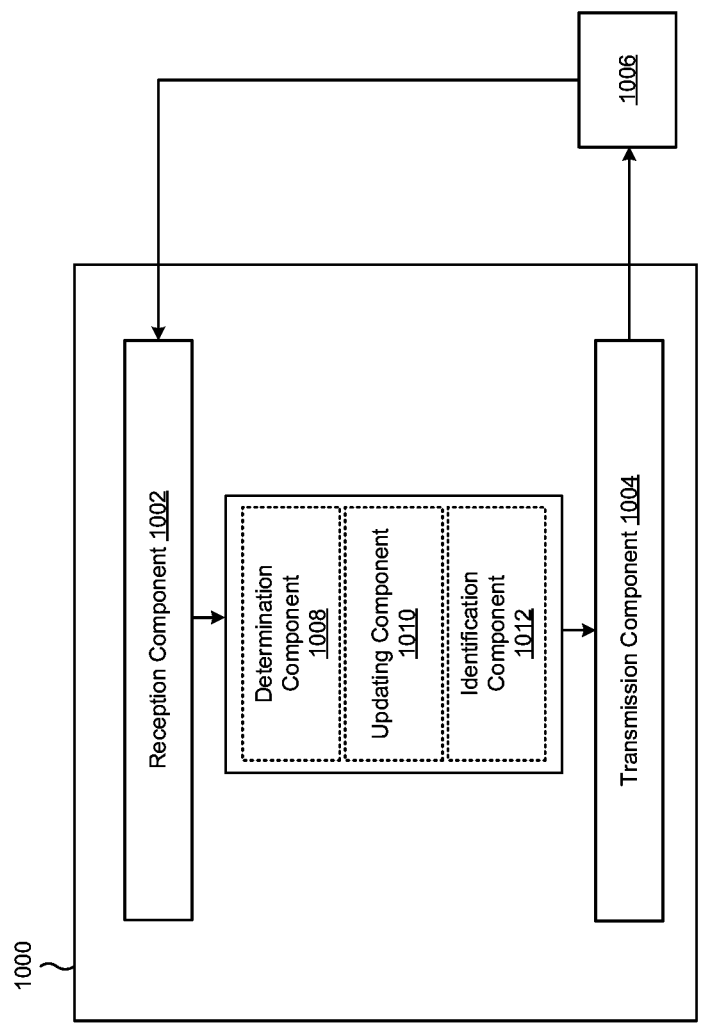
FIGS. 10-13 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008, a updating component 1010, or an identification component 1012, among other examples.

In some aspects, the apparatus 1000 may be configured to perform one or more operations described herein in connection with FIGS. 4 and 5. Additionally or alternatively, the apparatus 1000 may be configured to perform one or more processes described herein, such as process 600 of FIG. 6. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be collocated with the reception component 1002 in a transceiver.

The determination component 1008 may determine one or more candidate base stations for a handover procedure for the apparatus 1000. In some aspects, the determination component 1008 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1004 may transmit, in an RRC communication, an indication of the one or more candidate base stations to the apparatus 1006.

The transmission component 1004 may transmit, to the apparatus 1006, an indication of a UE capability associated with the apparatus 1000. The reception component 1002 may receive, based at least in part on the UE capability, an indication of the probability threshold from the apparatus 1006. The transmission component 1004 may transmit, to the apparatus 1006, an indication that the mobility prediction for the apparatus 1000 is available. The reception component 1002 may receive, from the apparatus 1006 and based at least in part on transmitting the indication that the mobility prediction for the apparatus 1000 is available, an indication to transmit the mobility prediction for the apparatus 1000 to the apparatus 1006. The transmission component 1004 may transmit, to the apparatus 1006 and based at least in part on receiving the indication to transmit the mobility prediction for the apparatus 1000, an indication of the mobility prediction for the apparatus 1000.

The updating component 1010 may update the indication of the mobility prediction for the apparatus 1000 based at least in part on a particular time interval indicated by the apparatus 1006. In some aspects, the updating component 1010 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The reception component 1002 may receive, from the apparatus 1006, an indication of a plurality of target base stations for the handover procedure for the apparatus 1000 wherein the plurality of target base stations are included among the one or more candidate base stations.

The identification component 1012 may identify a target base station of the plurality of target base stations based at least in part on a probability that the apparatus 1000 will encounter the target base station. In some aspects, the identification component 1012 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 1008 may determine one or more parameters for the handover procedure for the apparatus 1000 based at least in part on the probability. The reception component 1002 may receive, from the apparatus 1006, an indication of a target base station for the handover procedure for the apparatus 1000, wherein the target base station is included among the one or more candidate base stations.

The determination component 1008 may determine that a first probability that the apparatus 1000 will encounter the target base station is less than a second probability that the apparatus 1000 will encounter another candidate base station of the one or more candidate base stations. The apparatus 1000 may refrain from performing the handover procedure with the target base station based at least in part on the determination of the determination component 1008 that the first probability is less than the second probability. The transmission component 1004 may transmit, to the apparatus 1006, a measurement report associated with the one or more candidate base stations. The reception component 1002 may receive, from the apparatus 1006, an indication of one or more target base stations for the handover procedure for the apparatus 1000, wherein the one or more target base stations are based at least in part on at least one of: the indication of the one or more candidate base stations, or the measurement report.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
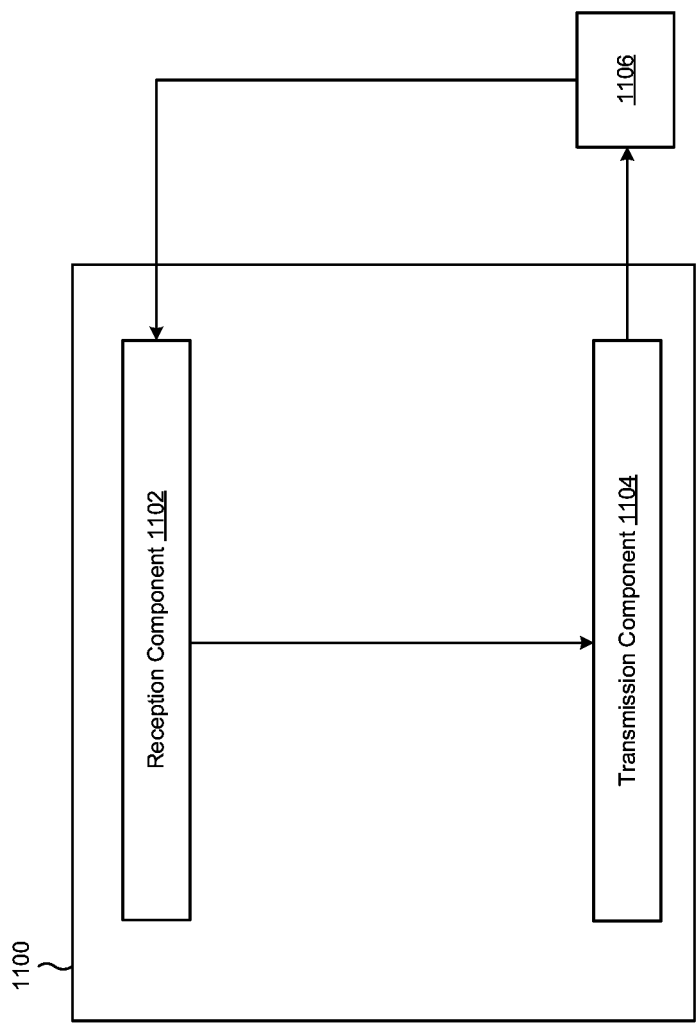

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 4 and 5. Additionally or alternatively, the apparatus 1100 may be configured to perform one or more processes described herein, such as process 700 of FIG. 7. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The transmission component 1104 may transmit, to the apparatus 1106, a communication that includes an indication of respective probabilities, based at least in part on a mobility prediction for the apparatus 1100, that the apparatus 1100 will encounter each of one or more candidate base stations for a handover procedure for the apparatus 1100, an indication of respective timings, based at least in part on the mobility prediction, for adding each of the one or more candidate base stations to a target base station list associated with the apparatus 1100, and a measurement report associated with the one or more candidate base stations. The reception component 1102 may receive, from the apparatus 1106 and based at least in part on transmitting the communication, an indication of one or more target base stations for the handover procedure for the apparatus 1100, wherein the one or more target base stations are included among the one or more candidate base stations.

The reception component 1102 may receive, from the apparatus 1106, an indication of one or more handover parameters, for the handover procedure for the apparatus 1100, that are based at least in part on at least one of the respective probabilities, the respective timings, the measurement report, or an outcome of a previous handover procedure for the apparatus 1100.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
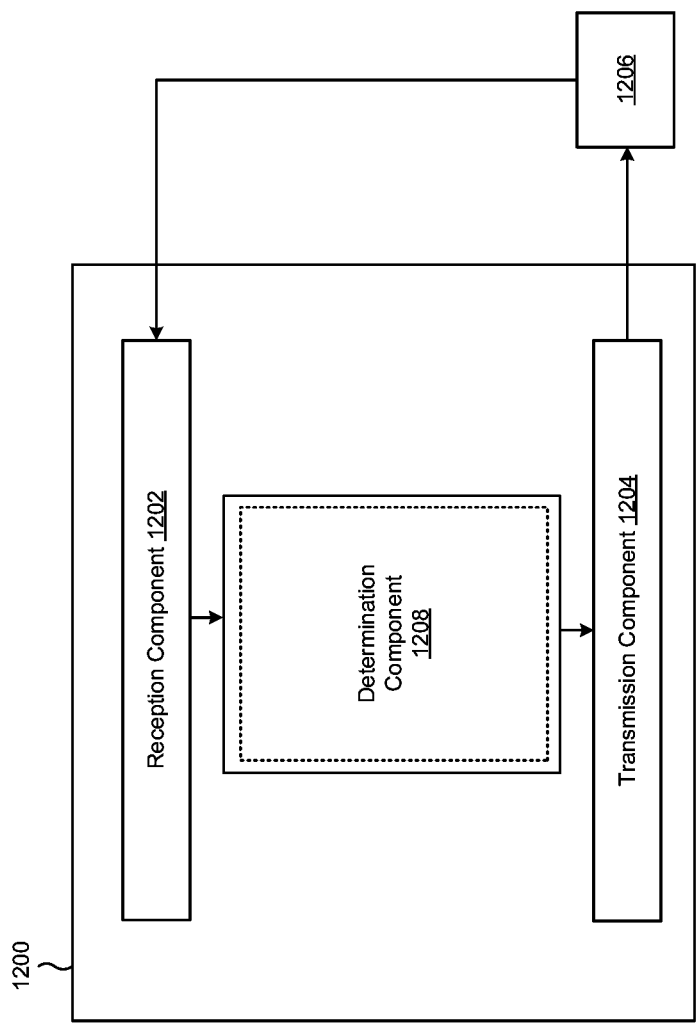

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208.

In some aspects, the apparatus 1200 may be configured to perform one or more operations described herein in connection with FIGS. 4 and 5. Additionally or alternatively, the apparatus 1200 may be configured to perform one or more processes described herein, such as process 800 of FIG. 8. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The reception component 1202 may receive, from the apparatus 1206, UE assistance information indicating one or more candidate base stations for a handover procedure for the apparatus 1206. The transmission component 1204 may transmit, to the apparatus 1206, an indication of one or more target base stations for the handover procedure for the apparatus 1206, wherein the one or more target base stations are included among the one or more candidate base stations.

The reception component 1202 may receive, from the apparatus 1206, an indication of a UE capability associated with the apparatus 1206. The transmission component 1204 may transmit, based at least in part on the UE capability, an indication of a probability threshold. The reception component 1202 may receive, from the apparatus 1206, a measurement report associated with the one or more candidate base stations. The determination component 1208 may determine the one or more target base stations based at least in part on at least one of the indication of the one or more candidate base stations, or the measurement report. In some aspects, the determination component 1208 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1204 may transmit, to the apparatus 1206, an indication of a particular time interval for transmitting the measurement report. The reception component 1202 may receive, from the apparatus 1206, an indication that the mobility prediction for the apparatus 1206 is available. The transmission component 1204 may transmit, to the apparatus 1206, and based at least in part on receiving the indication that the mobility prediction for the apparatus 1206 is available, an indication to transmit the mobility prediction for the UE to the serving base station. The reception component 1202 may receive, from the apparatus 1206, and based at least in part on receiving the indication to transmit the mobility prediction for the UE apparatus 1206, an indication of the mobility prediction for the apparatus 1206.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
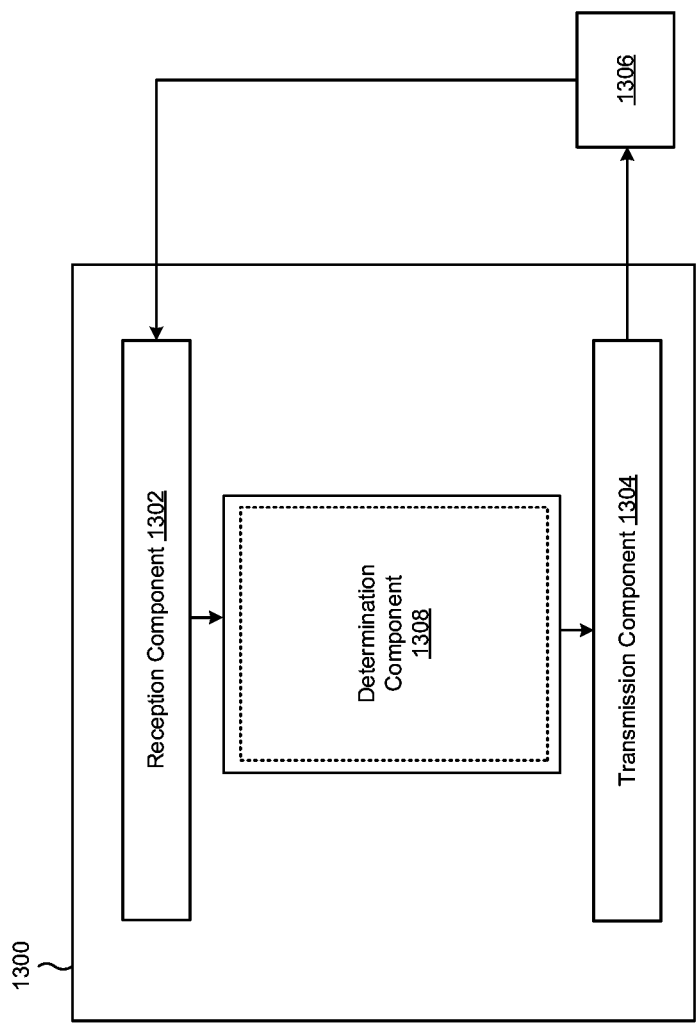

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308.

In some aspects, the apparatus 1300 may be configured to perform one or more operations described herein in connection with FIGS. 4 and 5. Additionally or alternatively, the apparatus 1300 may be configured to perform one or more processes described herein, such as process 900 of FIG. 9. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The reception component 1302 may receive, from the apparatus 1306, a communication that includes an indication of respective probabilities, based at least in part on a mobility prediction for the apparatus 1306, that the apparatus 1306 will encounter each of one or more candidate base stations for a handover procedure for the apparatus 1306, an indication of respective timings, based at least in part on the mobility prediction, for adding each of the one or more candidate base stations to a target base station list associated with the apparatus 1306, and a measurement report associated with the one or more candidate base stations. The transmission component 1304 may transmit, to the apparatus 1306 and based at least in part on receiving the communication, an indication of one or more target base stations for the handover procedure for the apparatus 1306, wherein the one or more target base stations are included among the one or more candidate base stations.

The determination component 1308 may determine one or more handover parameters, for the handover procedure for the apparatus 1306, that are based at least in part on at least one of the respective probabilities, the respective timings, the measurement report, or an outcome of a previous handover procedure for the apparatus 1306. In some aspects, the determination component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1304 may transmit an indication of the one or more handover parameters to the apparatus 1306.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment (UE), comprising:
    receiving a first indication of a probability threshold associated with a UE capability;
    determining, based at least in part on a first probability that the UE will encounter at least one candidate network entity of one or more candidate network entities satisfying the probability threshold, the at least one candidate network entity;
    transmitting, in a radio resource control (RRC) communication, a second indication of the at least one candidate network entity;
    transmitting a third indication that a mobility prediction is available, said mobility prediction indicating a prediction or an estimation of an expected path of movement of the UE
    receiving, based at least in part on transmitting the third indication, a fourth indication to transmit the mobility prediction; and
    transmitting, based at least in part on receiving the fourth indication, a fifth indication of the mobility prediction.

2. The method of claim 1, wherein the second indication comprises a network entity identifier of the at least one candidate network entity; and
    wherein the RRC communication further comprises at least one of:
        a sixth indication of the first probability that the UE will encounter the at least one candidate network entity, or
        a seventh indication of a timing, for adding the at least one candidate network entity to a target network entity list associated with the UE.

3. The method of claim 1, wherein the first probability is based at least in part on the mobility prediction.

4. The method of claim 1, further comprising:
    transmitting, a sixth indication of the UE capability.

5. The method of claim 1, wherein the fifth indication of the mobility prediction is included in the RRC communication or a measurement report associated with the at least one candidate network entity.

6. The method of claim 1, further comprising:
    updating the mobility prediction based at least in part on a particular time interval indicated by a serving network entity,
        wherein the first probability is associated with the updated mobility prediction.

7. The method of claim 1, wherein the at least one candidate network entity is a single candidate network entity based at least in part on at least one of:
    the mobility prediction,
    the first probability,
    one or more signal measurements associated with the single candidate network entity, or
    a cell coverage parameter associated with the single candidate network entity.

8. The method of claim 1, further comprising:
    receiving, a sixth indication of a plurality of target network entities for a handover procedure,
        wherein the one or more candidate network entities include the plurality of target network entities; and
    identifying a target network entity of the plurality of target network entities based at least in part on a second probability that the UE will encounter the target network entity.

9. The method of claim 8, wherein the second indication includes one or more parameters for the handover procedure based at least in part on the first probability.

10. The method of claim 8, wherein the handover procedure comprises:
    a conditional handover procedure (CHO),
    a legacy handover procedure, or
    a dual active protocol stack (DAPS) handover procedure.

11. The method of claim 1, further comprising:
    receiving a sixth indication of a target network entity for a handover procedure, wherein the target network entity is included among the one or more candidate network entities; and
    selectively performing the handover procedure with the target network entity based at least in part on a second probability that the UE will encounter the target network entity being less than a third probability that the UE will encounter another candidate network entity of the one or more candidate network entities.

12. The method of claim 1, wherein the RRC communication includes at least one of:
    a UEAssistanceInformation communication, or
    a mobility prediction communication.

13. The method of claim 1, further comprising:
    transmitting a measurement report associated with the at least one candidate network entity; and
    receiving a sixth indication of one or more target network entities, wherein the one or more target network entities are associated with at least one of:
        the second indication, or
        the measurement report.

14. The method of claim 13, wherein the measurement report is transmitted based at least in part on a particular time interval indicated by a serving network entity.

15. The method of claim 1, further comprising:

updating, at a particular time interval, the second indication prior to reception of a radio resource control (RRC) reconfiguration communication, wherein the updated second indication is transmitted, based on the RRC reconfiguration, in the RRC communication.

16. A method of wireless communication performed at a user equipment (UE), comprising:
receiving, from a serving network entity, a first indication of a probability threshold associated with a UE capability;
transmitting a communication that includes a second indication of a probability that the UE will encounter at least one candidate network entity of one or more candidate network entities, the probability satisfying the probability threshold;
receiving based at least in part on transmitting the communication, a third indication of one or more target network entities,
wherein:
the one or more candidate network entities include the one or more target network entities, and
the communication includes:
at least one of a fourth indication of a timing, associated with the probability, for adding the at least one candidate network entity to a target network entity list associated with the UE, or
a measurement report associated with the at least one candidate network entity;
receiving a time interval for updating the measurement report,
wherein:
the communication further includes an updated measurement report based on the time interval.

17. The method of claim 16, further comprising:
receiving a fifth indication of one or more parameters for a handover procedure that are based at least in part on at least one of the probability or an outcome of a previous handover procedure.

18. The method of claim 16, further comprising:
transmitting a fifth indication that a mobility prediction is available, said mobility prediction indicating a prediction or an estimation of an expected path of movement of the UE;
receiving, based at least in part on transmitting the fifth indication, a sixth indication to transmit the mobility prediction; and
transmitting, based at least in part on receiving the sixth indication, a seventh indication of the mobility prediction.

19. The method of claim 18, wherein the seventh indication of the mobility prediction is included in a RRC communication or a measurement report associated with the at least one candidate network entity.

20. The method of claim 16, further comprising:
receiving, a fifth indication of a target network entity for a handover procedure, wherein the target network entity is included among the one or more candidate network entities; and
selectively performing the handover procedure with the target network entity based at least in part on a second probability that the UE will encounter the target network entity being less than a third probability that the UE will encounter another candidate network entity of the one or more candidate network entities.

21. A method of wireless communication performed at a serving network entity, comprising:

transmitting a first indication of a probability threshold associated with a user equipment (UE) capability,
receiving in a radio resource control (RRC) communication, a second indication of one or more candidate network entities associated with a first probability that a UE will encounter the one or more candidate network entities, the first probability satisfying the probability threshold;
transmitting a third indication of one or more target network entities, wherein the one or more candidate network entities include the one or more target network entities;
receiving a fourth indication that a mobility prediction is available, the mobility prediction indicating a prediction or an estimation of an expected path of movement of the UE;
transmitting, based at least in part on receiving the fourth indication, a fifth indication to transmit the mobility prediction; and
receiving, based at least in part on transmitting the fifth indication, a sixth indication of the mobility prediction.

22. The method of claim 21, further comprising:
receiving a seventh indication of the UE capability,
wherein the first indication is transmitted based at least in part receiving the seventh indication.

23. The method of claim 21, further comprising:
receiving a measurement report associated with the one or more candidate network entities, wherein the one or more target network entities are based at least in part on at least one of:
the second indication, or
the measurement report.

24. The method of claim 23, further comprising:
transmitting a seventh indication of a particular time interval for transmitting the measurement report; and
wherein the measurement report is received based at least in part on the particular time interval.

25. The method of claim 21, wherein the first probability is based at least in part on the mobility prediction.

26. A method of wireless communication performed at a serving network entity, comprising:
transmitting a first indication of a probability threshold associated with a user equipment (UE) capability;
receiving a communication that includes a second indication of a probability that the UE will encounter at least one candidate network entity of one or more candidate network entities, satisfying the probability threshold; and
transmitting based at least in part on receiving the communication, a third indication of one or more target network entities, wherein:
the one or more candidate network entities include the one or more target network entities, and
the communication further includes:
at least one of a fourth indication of a timing, associated with the probability, for adding the at least one candidate network entity to a target network entity list associated with the UE, or
a measurement report associated with the candidate network entity;
transmitting a time interval for updating the measurement report, wherein:
the communication further includes an updated measurement report based on the time interval.

27. The method of claim 26, further comprising:
transmitting a fifth indication of one or more parameters for a handover procedure that are based at least in part on at least one of the probability or an outcome of a previous handover procedure.

28. The method of claim 26, further comprising:
receiving a fifth indication that a mobility prediction is available, said mobility prediction indicating a prediction or an estimation of an expected path of movement of the UE;
transmitting, based at least in part on receiving the fifth indication, a sixth indication to transmit the mobility prediction; and
receiving, based at least in part on transmitting the sixth indication, a seventh indication of the mobility prediction.

29. The method of claim 28, wherein the seventh indication of the mobility prediction is included in a RRC communication or a measurement report associated with the at least one candidate network entity.

30. The method of claim 26, further comprising:
transmitting, a fifth indication of a target network entity for a handover procedure, wherein the target network entity is included among the one or more candidate network entities; and
selectively performing the handover procedure with the target network entity based at least in part on a second probability that the UE will encounter the target network entity being less than a third probability that the UE will encounter another candidate network entity of the one or more candidate network entities.

* * * * *